(12) United States Patent
Kondo et al.

(10) Patent No.: US 7,454,083 B2
(45) Date of Patent: Nov. 18, 2008

(54) IMAGE PROCESSING APPARATUS, IMAGE PROCESSING METHOD, NOISE-AMOUNT ESTIMATE APPARATUS, NOISE-AMOUNT ESTIMATE METHOD, AND STORAGE MEDIUM

(75) Inventors: Tetsujiro Kondo, Tokyo (JP); Naoki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 87 days.

(21) Appl. No.: 11/504,469

(22) Filed: Aug. 15, 2006

(65) Prior Publication Data

US 2006/0274975 A1   Dec. 7, 2006

Related U.S. Application Data

(60) Division of application No. 11/081,209, filed on Mar. 16, 2005, now Pat. No. 7,209,595, which is a continuation of application No. 09/583,250, filed on May 31, 2000, now Pat. No. 6,970,605.

(30) Foreign Application Priority Data

Jun. 1, 1999   (JP) ................................. 11-153354

(51) Int. Cl.
*G06K 9/40* (2006.01)

(52) U.S. Cl. .................... 382/275; 348/533; 348/607; 382/112; 382/286

(58) Field of Classification Search ................ 348/452, 348/535, 607, 699, 533; 375/240.24; 382/236, 382/252, 254, 276, 112, 275, 286

See application file for complete search history.

(56) References Cited

U.S. PATENT DOCUMENTS 3,794,999 A * 2/1974 Gellekink ................... 342/168

(Continued)

FOREIGN PATENT DOCUMENTS

| EP | 0 280 412 | 8/1988 |
|---|---|---|
| EP | 0 574 969 | 12/1993 |
| EP | 0 821 322 | 1/1998 |
| EP | 0 847 054 | 6/1998 |
| JP | 09319866 | 12/1997 |

OTHER PUBLICATIONS

Bataillou et al., Weighted Averaging with Adaptive Weight Estimation, IEEE Conference in Computers in Cardiology, Sep. 23-26, 1991, Venice, Italy, IEEE Computer Society Press 1992, pp. 37-40.

(Continued)

*Primary Examiner*—Gregory M Desire
(74) *Attorney, Agent, or Firm*—Frommer Lawrence & Haug LLP; William S. Frommer; Thomas F. Presson

(57) ABSTRACT

An image processing apparatus processes input pixel data and outputs the processed pixel data as output pixel data. The image processing apparatus includes an input reliability calculation section for calculating an input reliability indicating the reliability of the input pixel data, an output reliability calculation section for calculating an output reliability indicating the reliability of the output pixel data, a motion-amount detecting section for detecting the amount of the motion of the input pixel data, a compensation section for compensating the output reliability according to the amount of the motion, and a processing section for processing the input pixel data according to the input reliability and the compensated output reliability and for outputting the output pixel data.

4 Claims, 20 Drawing Sheets

U.S. PATENT DOCUMENTS

| | | | |
|---|---|---|---|
| 3,950,733 A | | 4/1976 | Cooper et al. |
| 4,276,620 A | | 6/1981 | Kahn et al. |
| 4,630,305 A | * | 12/1986 | Borth et al. ................ 381/94.3 |
| 4,682,230 A | * | 7/1987 | Perlman et al. ............. 348/616 |
| 4,887,306 A | | 12/1989 | Hwang et al. |
| 4,941,122 A | | 7/1990 | Weideman |
| 5,038,388 A | | 8/1991 | Song |
| 5,062,123 A | * | 10/1991 | Geile et al. ................ 375/327 |
| 5,136,529 A | | 8/1992 | Makie et al. |
| 5,144,426 A | | 9/1992 | Tanaka et al. |
| 5,253,329 A | | 10/1993 | Villarreal et al. |
| 5,263,120 A | | 11/1993 | Bickel |
| 5,294,979 A | | 3/1994 | Patel et al. |
| 5,295,061 A | | 3/1994 | Katayama et al. |
| 5,353,307 A | | 10/1994 | Lester et al. |
| 5,402,520 A | | 3/1995 | Schnitta |
| 5,408,588 A | | 4/1995 | Ulug |
| 5,446,829 A | | 8/1995 | Wang et al. |
| 5,461,655 A | | 10/1995 | Vuylsteke et al. |
| 5,555,028 A | | 9/1996 | Kim |
| 5,577,161 A | * | 11/1996 | Pelaez Ferrigno .......... 704/226 |
| 5,598,429 A | * | 1/1997 | Marshall ..................... 375/149 |
| 5,598,484 A | | 1/1997 | Suzuki et al. |
| 5,602,761 A | | 2/1997 | Spoerre et al. |
| 5,604,602 A | | 2/1997 | Guillotel et al. |
| 5,644,662 A | | 7/1997 | Vuylsteke |
| 5,657,401 A | * | 8/1997 | De Haan et al. ............. 382/275 |
| 5,684,720 A | | 11/1997 | Hein |
| 5,694,342 A | | 12/1997 | Stein |
| 5,694,487 A | | 12/1997 | Lee |
| 5,742,704 A | | 4/1998 | Suzuki et al. |
| 5,764,307 A | | 6/1998 | Ozcelik et al. |
| 5,774,633 A | | 6/1998 | Baba et al. |
| 5,802,220 A | | 9/1998 | Black et al. |
| 5,812,993 A | | 9/1998 | Ginosar et al. |
| 5,822,011 A | * | 10/1998 | Rumreich ................... 348/549 |
| 5,828,467 A | | 10/1998 | Suzuki |
| 5,835,901 A | | 11/1998 | Duvoisin et al. |
| 5,838,835 A | | 11/1998 | Martens |
| 5,862,261 A | | 1/1999 | Lee |
| 5,875,216 A | | 2/1999 | Martin |
| 5,892,548 A | | 4/1999 | Kim |
| 5,909,178 A | | 6/1999 | Balch et al. |
| 5,920,599 A | | 7/1999 | Igarashi |
| 5,963,447 A | | 10/1999 | Kohn et al. |
| 6,034,734 A | | 3/2000 | De Haan et al. |
| 6,049,793 A | | 4/2000 | Tomita |
| 6,064,775 A | | 5/2000 | Suzuki et al. |
| 6,115,433 A | | 9/2000 | de Lantremange |
| 6,157,403 A | | 12/2000 | Nagata |
| 6,233,365 B1 | | 5/2001 | Teruhiko |
| 6,278,961 B1 | | 8/2001 | Kadtke et al. |
| 6,285,710 B1 | | 9/2001 | Hurst, Jr. et al. |
| 6,344,858 B1 | | 2/2002 | Vuylsteke et al. |
| 6,347,310 B1 | | 2/2002 | Passera |
| 6,430,524 B1 | | 8/2002 | Kondo et al. |
| 6,473,531 B1 | | 10/2002 | Kunitake |
| 6,564,180 B1 | | 5/2003 | Kondo et al. |
| 6,581,047 B1 | | 6/2003 | Raykhman et al. |
| 6,678,330 B1 | | 1/2004 | Kondo et al. |
| 6,804,383 B2 | | 10/2004 | Ogino |
| 6,970,605 B1 | | 11/2005 | Kondo et al. |
| 2003/0112668 A1 | * | 6/2003 | Takahashi et al. ........... 365/200 |
| 2006/0274975 A1 | * | 12/2006 | Kondo et al. ................ 382/286 |

OTHER PUBLICATIONS

Unser et al., Weighted Averaging with a Set of Noisy Images for Maximum Signal-to-Noise Ratio, IEEE Transactions on Acoustics, Speech, and Signal Processing, May 1990, vol. 38, pp. 890-895.

Official U.S. PlayStation Magazine, vol. 3, Issue 3 (7 pages; Dec. 1999).

Ozkan M. K. Et Al: "Adaptive Motion-Compensated Filtering of Noisy Image Sequences" IEEE Transactions on Circuits and Systems for Video Technology, IEEE Service Center, Piscataway, NJ, US, vol. 3, No. 4, Aug. 1, 1993, pp. 277-290, XP000414654, Issn: 1051-8215.

Reinen T. A.: "Noise Reduction in Heart Movies by Motion Compensated Filtering" Proceedings of The Spie, Spie, Bellingham, VA, US, vol. 1606, No. Part 2, Nov. 11, 1991, pp. 755-763, XP000645660, Issn: 0277-786x.

Olsen S I: "Estimation of Noise in Images: an Evaluation" Cvgip: Graphical Models and Image Processing, Academic Press, vol. 55, No. 4, Jul. 1, 1993, pp. 319-323, XP002302202 Issn: 1049-9652.

Rank K. Et Al: "Estimation of Image Noise Variance" IEE Proceedings: Vision, Image and Signal Processing Institution of Electrical Engineers, GB, vol. 146, No. 2, Apr. 23, 1999, pp. 80-84, XP006013793 Issn: 1350-245x.

* cited by examiner

⊘ : AIMED-AT PIXEL

● : PIXELS HAVING DIFFERENCES IN LEVEL FROM AIMED-AT PIXEL NOT MORE THAN THRESHOLD

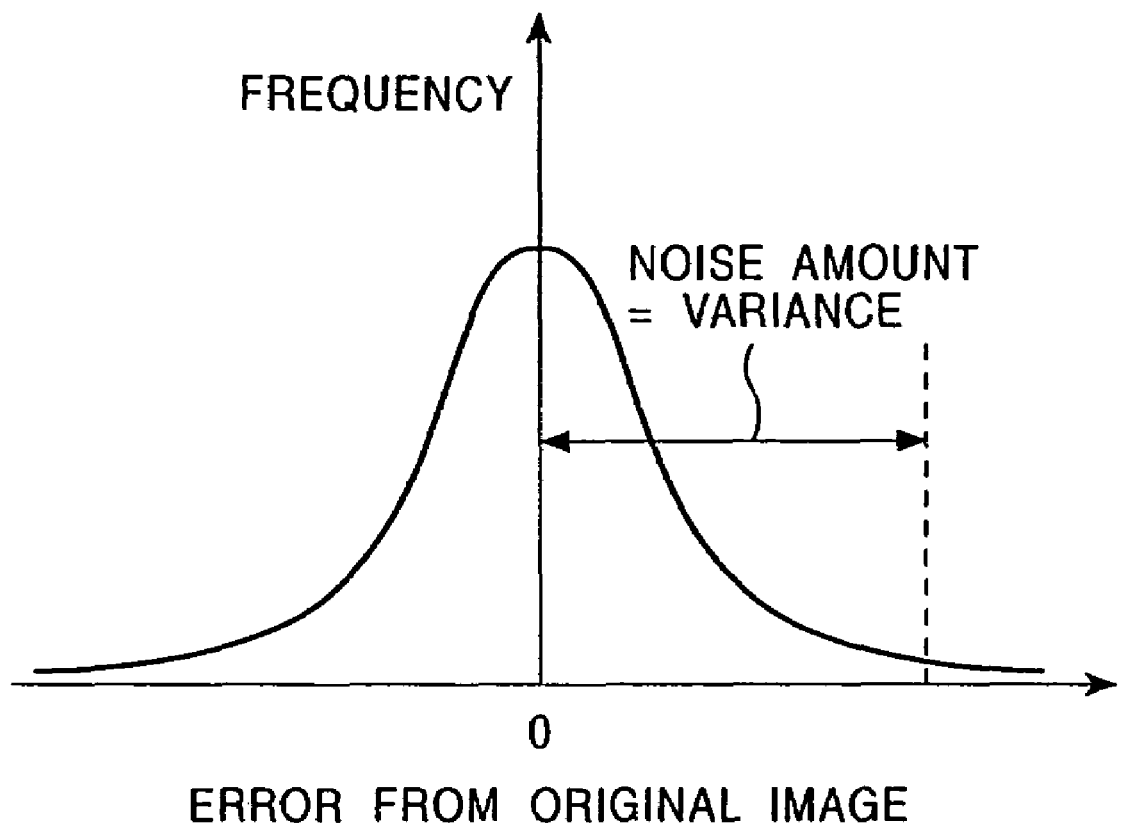

IMAGE PROCESSING APPARATUS, IMAGE PROCESSING METHOD, NOISE-AMOUNT ESTIMATE APPARATUS, NOISE-AMOUNT ESTIMATE METHOD, AND STORAGE MEDIUM

This application is a divisional of U.S. application Ser. No. 11/081,209, filed Mar. 16, 2005 now U.S. Pat. No. 7,209,595, which is a continuation of U.S. application Ser. No. 09/583,250, filed May 31, 2000 now U.S. Pat. No. 6,970,605, which is entitled to benefits under 35 USC 119 to Japanese Application 11-153354, filed in Japan on Jun. 1, 1999, the entirety of which is incorporated herein by reference.

BACKGROUND OF THE INVENTION

1. Field of the Invention

The present invention relates to image processing apparatuses, image processing methods, noise-amount estimate apparatuses, noise-amount estimate methods, and storage media, and more particularly, to an image processing apparatus, an image processing method, a noise-amount estimate apparatus, a noise-amount estimate method, and a storage medium which allow noise included in data, such as a motion image, to be removed more effectively.

2. Description of the Related Art

In general, data such as transmitted or reproduced image data and sound data includes noise which changes as time elapses. To remove the noise-included in the data, there have been known methods in which the average, namely, the whole average, of the whole input data is obtained and in which the average of a part of the input data, which is called a moving average, is obtained.

The method in which the whole average is calculated is effective when the degree of noise included in data, namely, the signal-to-noise ratio (S/N ratio) of the data, is uniform. When the S/N ratio of data varies, however, a portion of the data having a low S/N ratio affects a portion of the data having a high S/N ratio to make it difficult to remove the noise effectively in some cases.

In the method in which the moving average is calculated, since the average of data positioned close to the current input data in the time domain is obtained, the processing result is affected by a change in the S/N ratio of the data. In other words, the processing result has a high S/N ratio for a portion of the data having a high S/N ratio, but the processing result has a low S/N ratio for a portion of the data having a low S/N ratio.

When noise is removed from the data of a motion image, it may be difficult to remove the noise effectively due to movement even if the whole average or the moving average is obtained at a pixel disposed at the same position in each frame.

SUMMARY OF THE INVENTION

Accordingly, it is an object of the present invention to solve the foregoing drawbacks.

The foregoing object is achieved in one aspect of the present invention through the provision of an image processing apparatus for processing input pixel data and for outputting the processed input pixel data as output pixel data, including input reliability calculation means for calculating an input reliability indicating the reliability of the input pixel data; output reliability calculation means for calculating an output reliability indicating the reliability of the output pixel data; motion-amount detecting means for detecting the motion amount of the input pixel data; compensation means for compensating the output reliability according to the motion amount; and processing means for processing the input pixel data according o the input reliability and the compensated output reliability, and for outputting the output pixel data.

The foregoing object is achieved in another aspect of the present invention through the provision of a noise-amount estimate apparatus for estimating the amount of noise included in pixel data, including variance calculation means for processing in units of a predetermined number of pixels and for calculating the variance of a plurality of pixel data in a local area including each pixel data; histogram generating means for generating the histogram of the variance calculated for each pixel data, in units of the predetermined number of pixels; and noise-amount calculation means for obtaining the amount of noise included in the pixel data according to the histogram, in units of the predetermined number of pixels.

The foregoing object is achieved in still another aspect of the present invention through the provision of an image processing method for processing input pixel data and for outputting the processed input pixel data as output pixel data, including a step of calculating an input reliability indicating the reliability of the input pixel data; a step of calculating an output reliability indicating the reliability of the output pixel data; a step of detecting the motion amount of the input pixel data; a step of compensating the output reliability according to the motion amount; and a step of processing the input pixel data according to the input reliability and the compensated output reliability, and of outputting the output pixel data.

The foregoing object is achieved in yet another aspect of the present invention through the provision of a noise-amount estimate method for estimating the amount of noise included in pixel data, including a step of processing in units of a predetermined number of pixels and of calculating the variance of a plurality of pixel data in a local area including each pixel data; a step of generating the histogram of the variance calculated for each pixel data, in units of the predetermined number of pixels; and a step of obtaining the amount of noise included in the pixel data according to the histogram, in units of the predetermined number of pixels.

The foregoing object is achieved in yet still another aspect of the present invention through the provision of a storage medium for storing a computer-controllable program for processing input pixel data and for outputting the processed input pixel data as output pixel data, the program including a step of calculating an input reliability indicating the reliability of the input pixel data; a step of calculating an output reliability indicating the reliability of the output pixel data; a step of detecting the motion amount of the input pixel data; a step of compensating the output reliability according to the motion amount; and a step of processing the input pixel data according to the input reliability and the compensated output reliability, and of outputting the output pixel data.

The foregoing object is achieved in a further aspect of the present invention through the provision of a storage medium for storing a computer-controllable program for estimating the amount of noise included in pixel data, the program including a step of processing in units of predetermined number of pixels and of calculating the variance of a plurality of pixel data in a local area including each pixel data; a step of generating the histogram of the variance calculated for each pixel data, in units of the predetermined number of pixels; and a step of obtaining the amount of noise included in the pixel data according to the histogram, in units of the predetermined number of pixels.

BRIEF DESCRIPTION OF THE DRAWINGS

In FIG. 13, (A) shows an image without noise, (B) shows the image of noise which changes in frames but is constant spatially, (C) shows an image having noise generated by adding the image shown in (A) to that shown in (B), and (D) shows the estimated noise amount of the image having noise shown in (C).

FIG. 14 is a view showing the amount of noise.

DESCRIPTION OF THE PREFERRED EMBODIMENT

Figure 1:
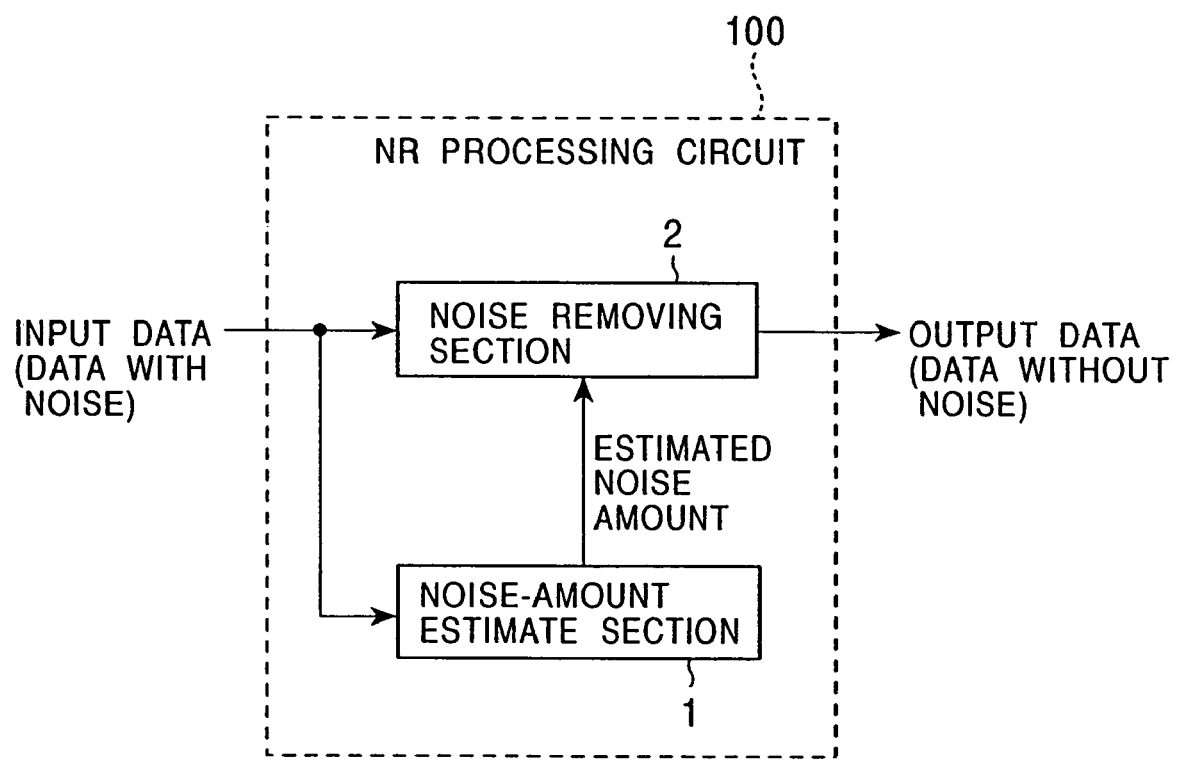
FIG. 1 is a block diagram of an noise reduction (NR) processing circuit according to an embodiment of the present invention.

FIG. 1 shows an example structure of a noise reduction (NR) processing circuit 100 according to an embodiment of the present invention.

This NR processing circuit 100 is formed of a noise-amount estimate section 1 and a noise removing section 2. The noise-amount estimate section 1 estimates the amount of noise included in input data, and the noise removing section 2 applies processing to the input data according to the amount of noise. The NR processing circuit 100 effectively removes noise from the input data and outputs data.

Figure 2A:
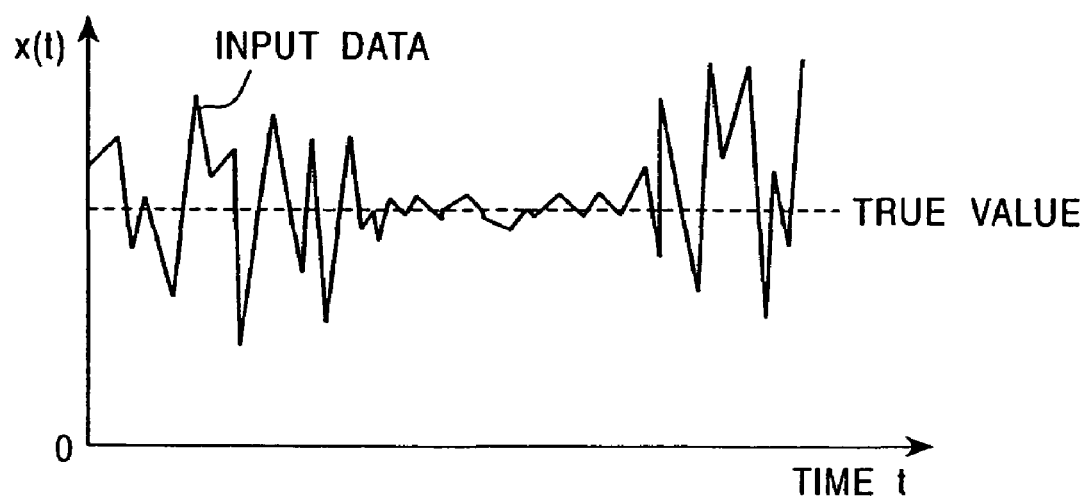
FIG. 2A is a view showing the input data to be processed by the NR processing circuit shown in FIG. 1.

Specifically, for example, to simplify a description, a case is examined in which input data having a constant true value and on which noise fluctuating in time is superposed, as shown in FIG. 2A, is averaged to remove the noise fluctuating in time. The noise is effectively removed by setting a weight for input data having a large noise level, namely, having a low S/N ratio, to a small value and by setting a weight for input data having a small noise level, namely having a high S/N ratio, to a large value.

Figure 2B:
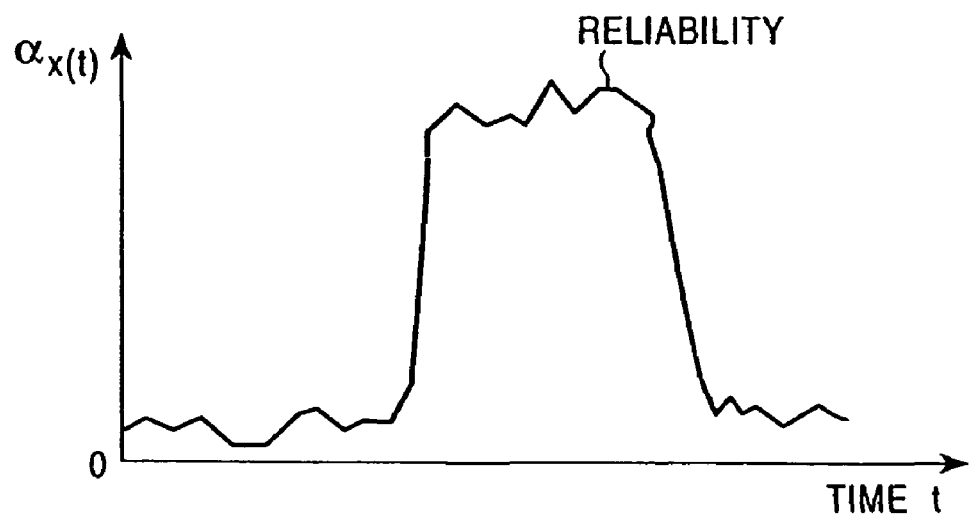
FIG. 2B is a view showing the reliability of the input data to be processed by the NR processing circuit shown in FIG. 1.

In the NR processing circuit 100 shown in FIG. 1, as the evaluation value of input data, the degree of reliability indicating how the input data is close to the true value, which is the reliability of the input data against the true value, for example, shown in FIG. 2B, is obtained. The NR processing circuit 100 calculates its average while the weight corresponding to the reliability is applied to the input data, to effectively remove the noise.

Therefore, the NR processing circuit 100 shown in FIG. 1 obtains a weighted average of the input data by the use of the weight corresponding to its reliability and outputs it as output data. The output data y(t) is obtained from the following expression, where x(t), y(t), and $\alpha_{x(t)}$ indicate the input data, the output data, and the reliability of the input data at the time "t," respectively.

$$y(t) = \frac{\sum_{i=0}^{t} \alpha_{x(i)} x(i)}{\sum_{i=0}^{t} \alpha_{x(i)}} \quad (1)$$

It is assumed here that a larger weight is given to the higher degree of reliability $\alpha_{x(t)}$ of input data.

The output data y(t−b 1), obtained one sample before the current time "t," is calculated as follows from the expression (1).

$$y(t-1) = \frac{\sum_{i=0}^{t-1} \alpha_{x(i)} x(i)}{\sum_{i=0}^{t-1} \alpha_{x(i)}} \quad (2)$$

As for the output data y(t), the degree of reliability $\alpha_{y(t)}$ indicating how the output data y(t) is close to the true value, which is the reliability of the output data y(t) against the true value, is introduced as an evaluation value of the output data y(t). The reliability $\alpha_{y(t-1)}$ of the output data y(t-1), obtained one sample before the current time "t," is defined by the following expression.

$$\alpha_{y(t-1)} = \sum_{i=0}^{t-1} \alpha_{x(i)} \quad (3)$$

According to the expression (3), the reliability $\alpha_{y(t-1)}$ of the output data y(t-1) is the sum of the reliability $\alpha_{x(i)}$ of the input data x(i) (i=0, 1, 2, ... t-1) processed so far. Therefore, the reliability $\alpha_{y(t-1)}$ of the output data y(t-1) is large when input data close to the true value has been input so far in many cases, and the reliability is small when input data close to the true value has been input so far in a few cases. In other words, the reliability $\alpha_{y(t-1)}$ of the output data y(t-1) reflects the closeness (reliability) of the input data which has been input so far to the true value. When input data which has been input so far is close to the true value, it means that the output data y(t-1) is also close to the true value. Conversely, when input data which has been input so far is distant from the true value, it means that the output value y(t-1) is also distant from the true value. Therefore, the reliability $\alpha_{y(t-1)}$ expressed by the expression (3) represents the closeness of the output data y(t-1) to the true value.

The output data y(t) and its reliability $\alpha_{y(t)}$ are expressed as follows with the use of the expressions (1) to (3).

$$y(t) = \frac{\overbrace{\alpha_{y(t-1)}}^{\sum_{i=0}^{t-1}\alpha_{x(i)}} y(t-1)}{\underbrace{\sum_{i=0}^{t-1}\alpha_{x(i)} + \alpha_{x(t)}}_{\alpha_{y(t-1)}}} = \frac{\alpha_{y(t-1)}y(t-1) + \alpha_{x(t)}x(t)}{\alpha_{y(t-1)} + \alpha_{x(t)}} \quad (4)$$

$$\alpha_{y(t)} = \alpha_{y(t-1)} + \alpha_{x(t)} \quad (5)$$

The weight used to obtain the output data y(t) at the time "t" is indicated by w(t), and defined by the following expression.

$$w(t) = \alpha_{y(t-1)}/(\alpha_{y(t-1)} + \alpha_{x(t)}) \quad (6)$$

From the expression (6), the following expression is satisfied.

$$1 - w(t) = \alpha_{x(t)}/(\alpha_{y(t-1)} + \alpha_{x(t)}) \quad (7)$$

With the use of the expressions (6) and (7), the output data y(t) in the expression (4) can be expressed in the following way by a weighted average obtained by multiplications and an addition.

$$y(t) = w(t)y(t-1) + (1-w(t))x(t) \quad (8)$$

The weights w(t) and 1-w(t) used in the expression (8) can be obtained from the expression (6) with the use of the reliability $\alpha_{y(t-1)}$ of the output data y(t-1) obtained one sample before and the reliability $\alpha_{x(t)}$ of the current input data x(t). The reliability $\alpha_{y(t)}$ of the current output data y(t) in the expression (5) can also be obtained with the use of the reliability $\alpha_{y(t-1)}$ of the output data y(t-1) obtained one sample before and the reliability $\alpha_{x(t)}$ of the current input data x(t).

The reliability $\alpha_{x(t)}$ of input data x(t) shown in FIG. 2B is the reciprocal of the variance of input data in the vicinity thereof. When the reliability $\alpha_{x(t)}$ of the input data x(t) and the reliability $\alpha_{y(t)}$ of the output data y(t) are expressed, respectively, by the reciprocals of the corresponding variances $\sigma_{x(t)}^2$ or $\sigma_{y(t)}^2$, in other words, when the reliability $\alpha_{x(t)}$ and the reliability $\alpha_{y(t)}$ are set as follows, $$\alpha_{x(t)} = 1/\sigma_{x(t)}^2$$

$$\alpha_{y(t)} = 1/\sigma_{y(t)}^2 \quad (9)$$

the weight w(t) in the expression (8) can be obtained by the following expression.

$$w(t) = \sigma_{x(t)}^2/(\sigma_{y(t-1)}^2 + \sigma_{x(t)}^2) \quad (10)$$

In this case, 1-w(t) in the expression (8) can be obtained by the following expression.

$$1 - w(t) = \sigma_{y(t-1)}^2/(\sigma_{y(t-1)}^2 + \sigma_{x(t)}^2) \quad (11)$$

A term, $\sigma_{y(t)}^2$, can be obtained by the following expression.

$$\sigma_{y(t)}^2 = w(t)^2 \sigma_{y(t-1)}^2 + (1-w(t))^2 \sigma_{x(t)}^2 \quad (12)$$

It is clear from the expression (4) that the expression (8) obtained from the expressions (4) and (5) shows that the input data x(t) is weighted by the weight corresponding to the reliability $\alpha_{x(t)}$ thereof, the output data y(t-1) obtained one sample before is also weighted by the weight corresponding to the reliability $\alpha_{y(t-1)}$ thereof, the weighted input data and the weighted output data are added, and the sum is used as the output data y(t), which is the data obtained by removing noise from the input data x(t).

The reliability $\alpha_{x(t)}$ corresponding to the weight for the input data x(t) indicates the closeness of the input data x(t) against the true value, an d the reliability $\alpha_{y(t-1)}$ corresponding to the weight for the output data y(t-1) obtained one sample before indicates the closeness of the output data y(t-1) against the true value. Since the true Value is constant in the present embodiment, when the output data y(t) is obtained by the expression (8), which executes an addition with whichever of the input data x(t) and the output data y(t-1) closer to the true value being considered more important, the output data y(t) is closer to the true value.

In other words, a small weight is applied to input data having a small reliability, which has been input, a large weight is applied to that having a large reliability, and the input data weighted in such a way is summed to obtain the output data y(t) by the expression (8) (equivalent to the expression (1)) led from the expression (1). More intuitively, the output data y(t) is obtained by adding input data such that input data having much noise do not affect much and input data having little noise affects much.

Therefore, when the whole average is obtained, both input data having a low s/n ratio and input data having a high s/n ratio affect output data at the same level. According to the expression (8), however, in the present embodiment, input data having a low s/n ratio affects output data little, and input data having a high s/n ratio affects the output data much. As a result, the output data with noise being more effectively removed than in a case the whole average is used is obtained.

When the moving average is obtained, input data distant in time do not affect output data at all even if it has a high s/n ratio, and input data close in time affects the output data much even if it has a low s/n ratio. According to the expression (8), however, in the present embodiment, input data affects the output data according to its s/n ratio irrespective of the closeness in time. As a result, the output data with noise being more effectively removed than in a case when the moving average is used is obtained.

As described above, according to the expression (8), the output data becomes closer to the true value by the effect of input data having a high reliability (close to the true value). Therefore, as input data having a high reliability is processed in many cases, the output data approaches the true value. As a result, the S/N ratio of the output data is improved as time elapses.

In the above embodiment, it is assumed that the true value its constant. For data with the true value being changed, it is necessary, for example, to divide the data into zones in which it is considered that the true value is constant, and to apply the processing to each zone.

In the above embodiment, the variance of some input data items disposed in the vicinity in time is used as the reliability (hereinafter called input reliability) of the input data. In this case, input reliability, output data, or the reliability (hereinafter called output reliability) of the output data cannot be obtained until the some input data items are input. Until input data items used for obtaining input reliability are input, it is possible, for example, that input reliability or output reliability is not calculated, and the simple average of input data which has been input so far is obtained and used as the output data. A method used until input data items used for obtaining input reliability are input is not limited to the above one.

Figure 3:
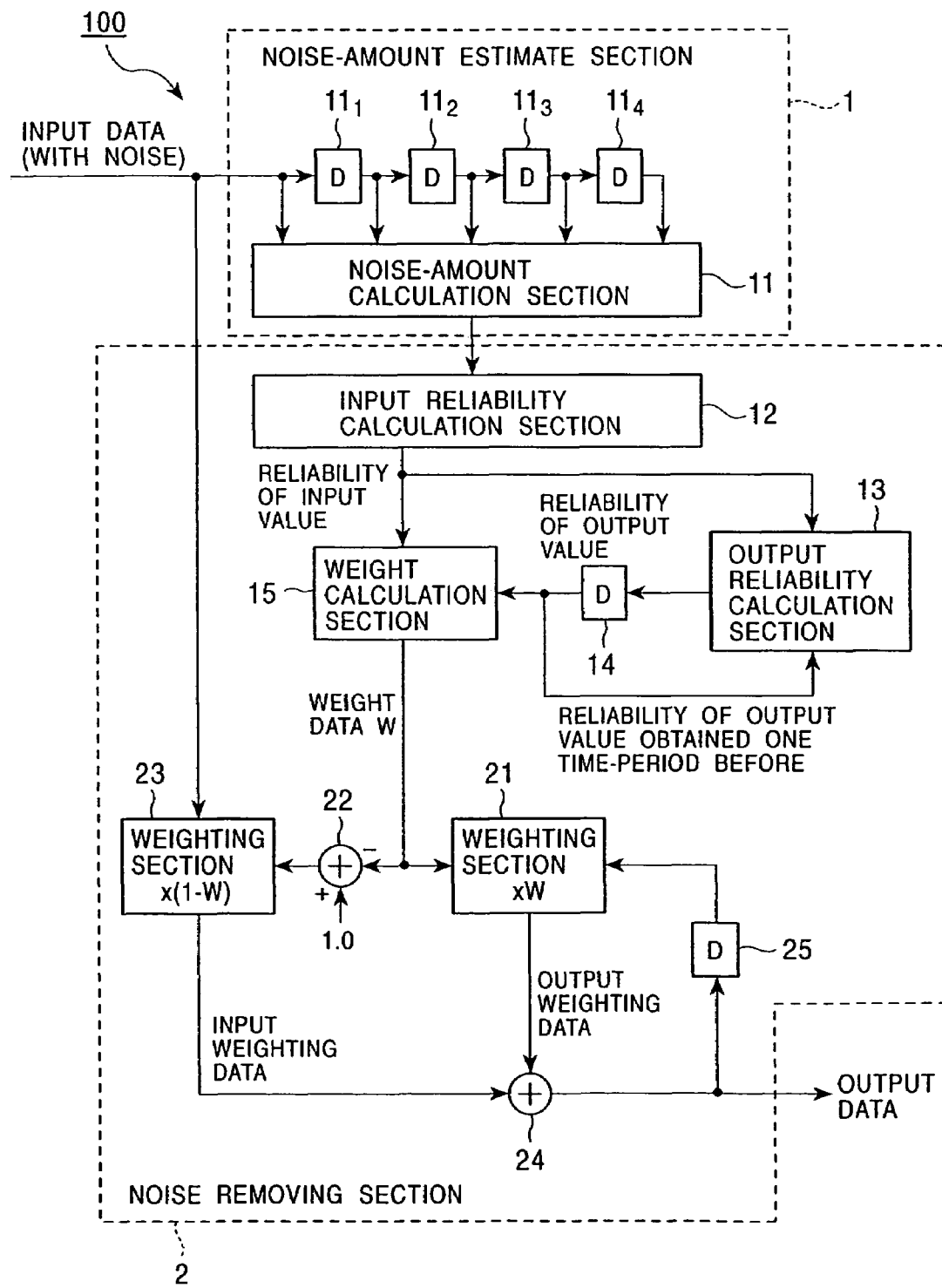
FIG. 3 is a block diagram showing an example structure of the NR processing circuit shown in FIG. 1.

FIG. 3 shows a detailed example structure of the NR processing circuit 100 shown in FIG. 1, which removes the noise of input data in the foregoing way.

A latch circuit $11_1$ receives input data. The latch circuit $11_1$ latches the input data, for example, in synchronization with the timing when the input data is received, and sends it to a subsequent-stage latch circuit $11_2$ and to an noise-amount calculation section 11. The latch circuit $11_2$ and a latch circuit $11_3$ latch the data output from the previous-stage latch circuits $11_1$ and $11_2$, and send it to the subsequent-stage latch circuits $11_3$ and $11_4$, respectively, and to the noise-amount calculation section 11, in the same way as the latch circuit $11_1$. The latch circuit $11_4$ latches the data output from the previous-stage latch circuit $11_3$ and sends it to the noise-amount calculation section 11.

The noise-amount calculation section 11 receives the same input data as that sent to the latch circuit $11_1$ in addition to the input data latched by the latch circuits $11_1$ to $11_4$. Therefore, when input data x(t) is sent to the latch circuit $11_1$ and to the noise-amount calculation section 11, the noise-amount calculation section 11 also receives input data x(t−1) to x(t−4) latched by the latch circuits $11_1$ to $11_4$. The input reliability calculation circuit 12 calculates, for example, the variance of input data from the input data x(t) to x(t−4), and sends the variance as the noise amount of the input data x(t) to an input reliability calculation section 12.

The noise-amount calculation section 11 and the latch circuits $11_1$ to $11_4$ correspond to the noise-amount estimate section 1 shown in FIG. 1.

The input reliability calculation section 12 calculates the input reliability $\alpha_{x(t)}$ of the input x(t) according to the noise amount sent from the noise-amount calculation section 11, and sends it to an output reliability calculation section 13 and to an weight calculation section 15. Specifically, the input reliability calculation section 12 obtains the reciprocal of the variance serving as the noise amount sent from the noise-amount calculation section 11, and outputs it as the input reliability $\alpha_{x(t)}$.

The output reliability calculation section 13 obtains the output reliability $\alpha_{y(t)}$ according to the expression (5) with the use of the input reliability $\alpha_{x(t)}$ sent from the input reliability calculation section 12 and the output of a latch circuit 14, and outputs it to the latch circuit 14.

The latch circuit 14 latches the output reliability $\alpha_{y(t)}$ sent from the output reliability calculation section 13, for example, in synchronization with latching of the input data x(t), and sends it to the output reliability calculation section 13 and the weight calculation section 15. Therefore, the latch circuit 14 sends the output reliability $\alpha_{y(t-1)}$ obtained one sample before, to the output reliability calculation section 13 and the weight calculation section 15.

The weight calculation section 15 obtains a weight w(t) according to the expression (6) with the use of the input reliability $\alpha_{x(t)}$ sent from the input reliability calculation section 12 and the output reliability $\alpha_{y(t-1)}$ sent from the latch circuit 14, and sends it to a weighting section 21 and an operation section 22.

The weighting section 21 multiplies the weight w(t) sent from the weight calculation section 15 by the output of a latch circuit 25, and sends the product to an operation section 24. The operation section 22 subtracts the weight w(t) sent from the weight calculation section 15, from one, and sends the subtraction result, 1−w(t), to a weighting section 23. The weighting section 23 receives the input data x(t) as well as the output of the operation section 22. The weighting section 23 multiplies the input data x(t) by the output of the operation section 22, and sends the product to the operation section 24. The operation section 24 adds the outputs of the weighting sections 21 and 23, outputs the sum as output data y(t), and sends it to the latch circuit 25. The latch circuit 25 latches the output data of the operation section 24, for example, in synchronization with latching of the input data x(t), and sends it to the weighting section 21.

The input reliability calculation section 12, the output reliability calculation section 13, the latch circuit 14, the weight calculation section 15, the weighting section 21, the operation section 22, the weighting section 23, the operation section 24, and the latch circuit 25 correspond to the noise removing section 2 shown in FIG. 1.

Figure 4:
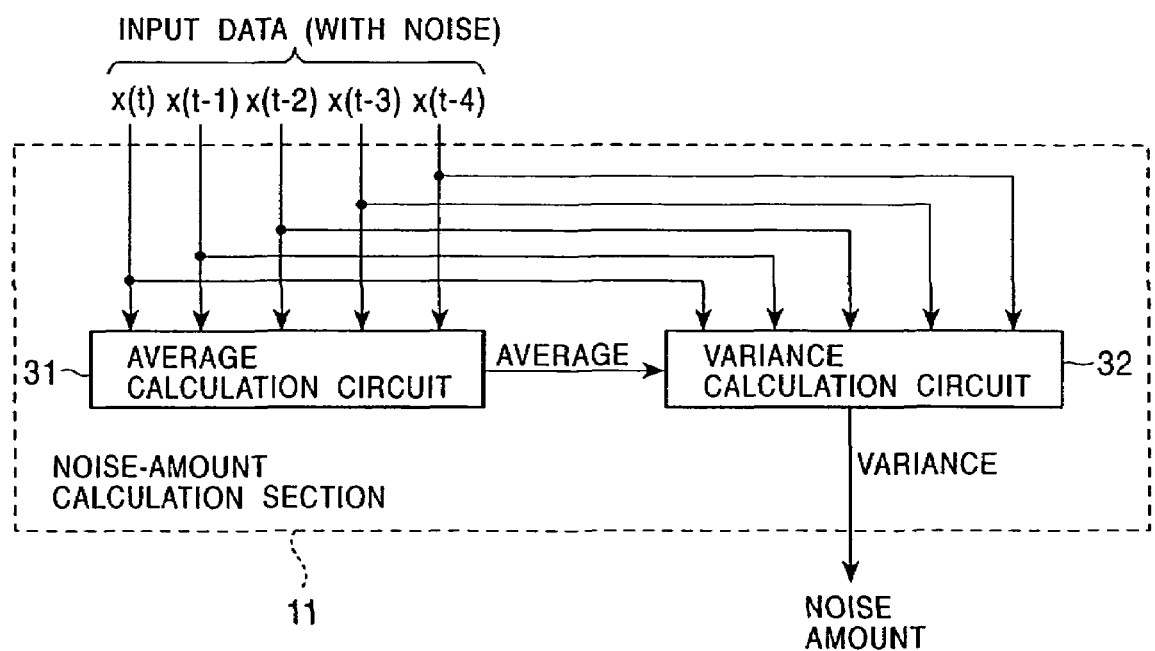
FIG. 4 is a block diagram showing an example structure of a noise-amount calculation section 11 shown in FIG. 3.

FIG. 4 shows an example structure of the noise-amount calculation section 11 shown in FIG. 3.

Figure 5:
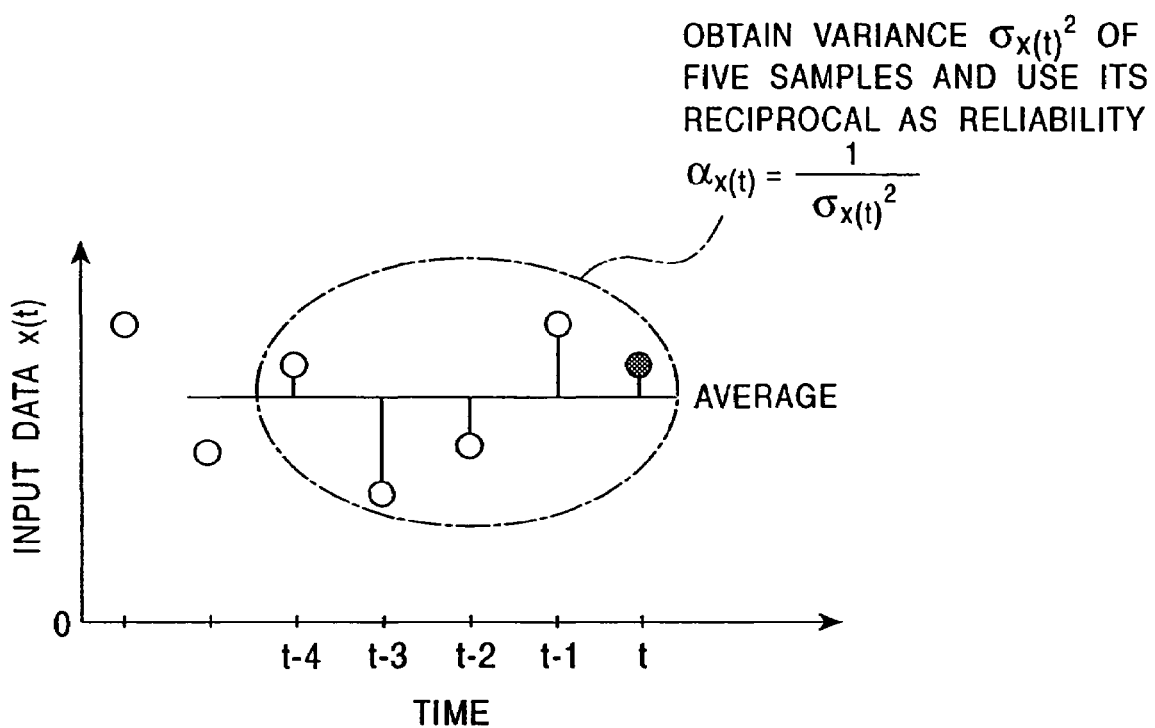
FIG. 5 is a view showing the processing of the noise-amount calculation section 11 shown in FIG. 4.

As described above, the noise-amount calculation section 11 receives the current input data x(t) and, in addition, the input data x(t−1) to x(t−4), up to four samples before the current one. The noise-amount calculation section 11 obtains the variance of the five-sample input data x(t) to x(t−4) as shown in FIG. 5, and outputs it as the noise amount of the input data x(t).

Specifically, the input data x(t) to x(t−4) is sent to an average calculation circuit 31 and to a variance calculation circuit 32. The average calculation circuit 31 calculates the average m(t) of the five-sample input data x(t) to x(t−4) according to the following expression and sends the result to the variance calculation circuit 32.

$$m(t) = \frac{\sum_{n=0}^{N-1} x(t-n)}{N} \quad (13)$$

In the embodiment shown in FIG. 4, N equals 5 in the expression (13).

The variance calculation circuit 32 uses the input data x(t) to x(t−4) input thereto and the average m(t) sent from the average calculation circuit 31 to calculate the variance $\sigma_{x(t)}^2$ according to an expression (14) and outputs it as the noise amount of the input data x(t).

$$\sigma_{x(t)}^2 = \frac{\sum_{n=0}^{N-1}(x(t-n)-m(t))^2}{N} \quad (14)$$

In the same way as in the expression (13), N also equals 5 in the expression (14) in the embodiment shown in FIG. 4.

The variance $\sigma_{x(t)}^2$ serving as the noise amount is sent to the input reliability calculation section 12 (shown in FIG. 3). The input reliability calculation section 12 obtains the reciprocal of the variance $\sigma_{x(t)}^2$ as shown in the following expression, and outputs it as the input reliability $\alpha_{x(t)}$.

$$\alpha_{x(t)} = \frac{1}{\sigma_{x(t)}^2} \quad (15)$$

Figure 6:
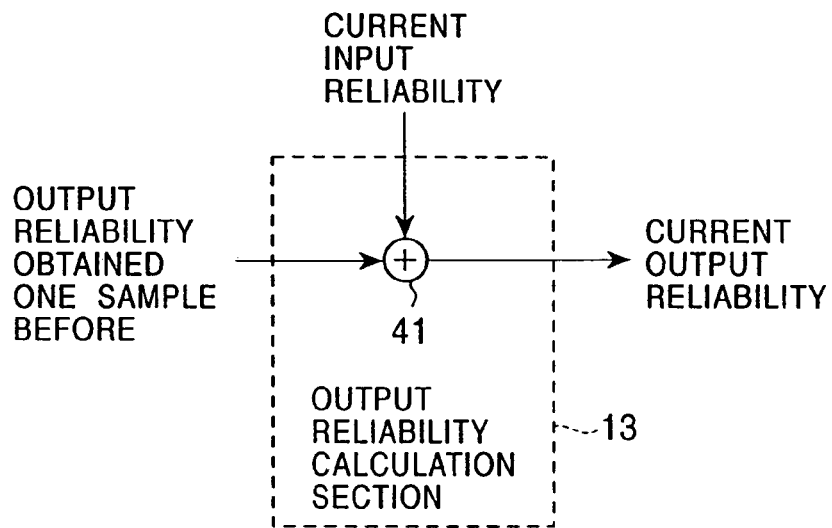
FIG. 6 is a block diagram showing an example structure of an output reliability calculation section 13 shown in FIG. 3.

FIG. 6 shows an example structure of the output reliability calculation section 13 shown in FIG. 3.

As shown in FIG. 6, the output reliability calculation section 13 is formed of an operation section 41. The operation section 41 receives the current input reliability $\alpha_{x(t)}$ sent from the input reliability calculation section 12 and the output reliability $\alpha_{y(t-1)}$ obtained one sample before, sent from the latch circuit 14. The operation section 41 adds the input reliability $\alpha_{x(t)}$ and the output reliability $\alpha_{y(t-1)}$ according to the expression (4) and outputs the sum as the current output reliability $\alpha_{y(t)}$.

The operation of the NR processing circuit 100 shown in FIG. 3 will be described below by referring to FIGS. 7A and 7B and FIG. 8. The operation of the NR processing circuit 100 and the control of each functional block may be implemented by each hardware block shown in the figures or by software. Alternatively, a controller may control each hardware.

Figure 7A:
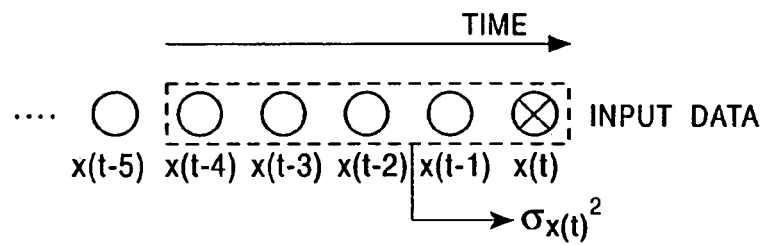
FIG. 7A is a view showing the processing of input data in the NR processing circuit shown in FIG. 3.

As shown in FIG. 7A, the NR processing circuit 100 uses five samples, the current input data x(t) and the input data x(t−1) to x(t−4) obtained up to four samples before the current one, to obtain the variance $\sigma_{x(t)}^2$ thereof, and further obtains the reciprocal of the variance as the input reliability $\alpha_{x(t)}$.

Figure 7B:
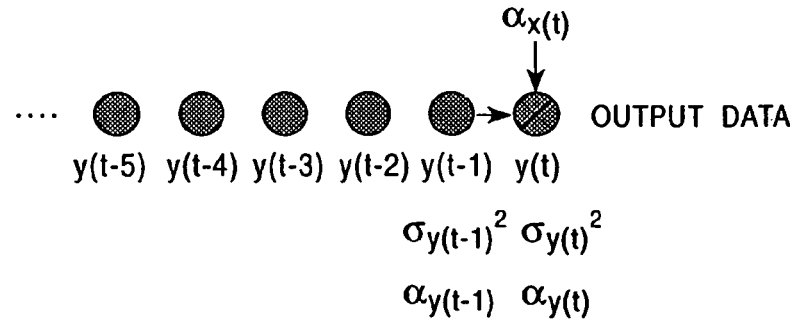
FIG. 7B is a view showing the processing of output data in the NR processing circuit shown in FIG. 3.

The weight w(t) is obtained as shown in FIG. 7B with the use of the input reliability $\alpha_{x(t)}$ and the output reliability $\alpha_{y(t-1)}$ obtained one sample before, and the weighted average of the input data x(t) and the output data y(t−1) obtained one sample before is calculated according to the weight w(t) to output the weighted average as the output data y(t).

Figure 8:
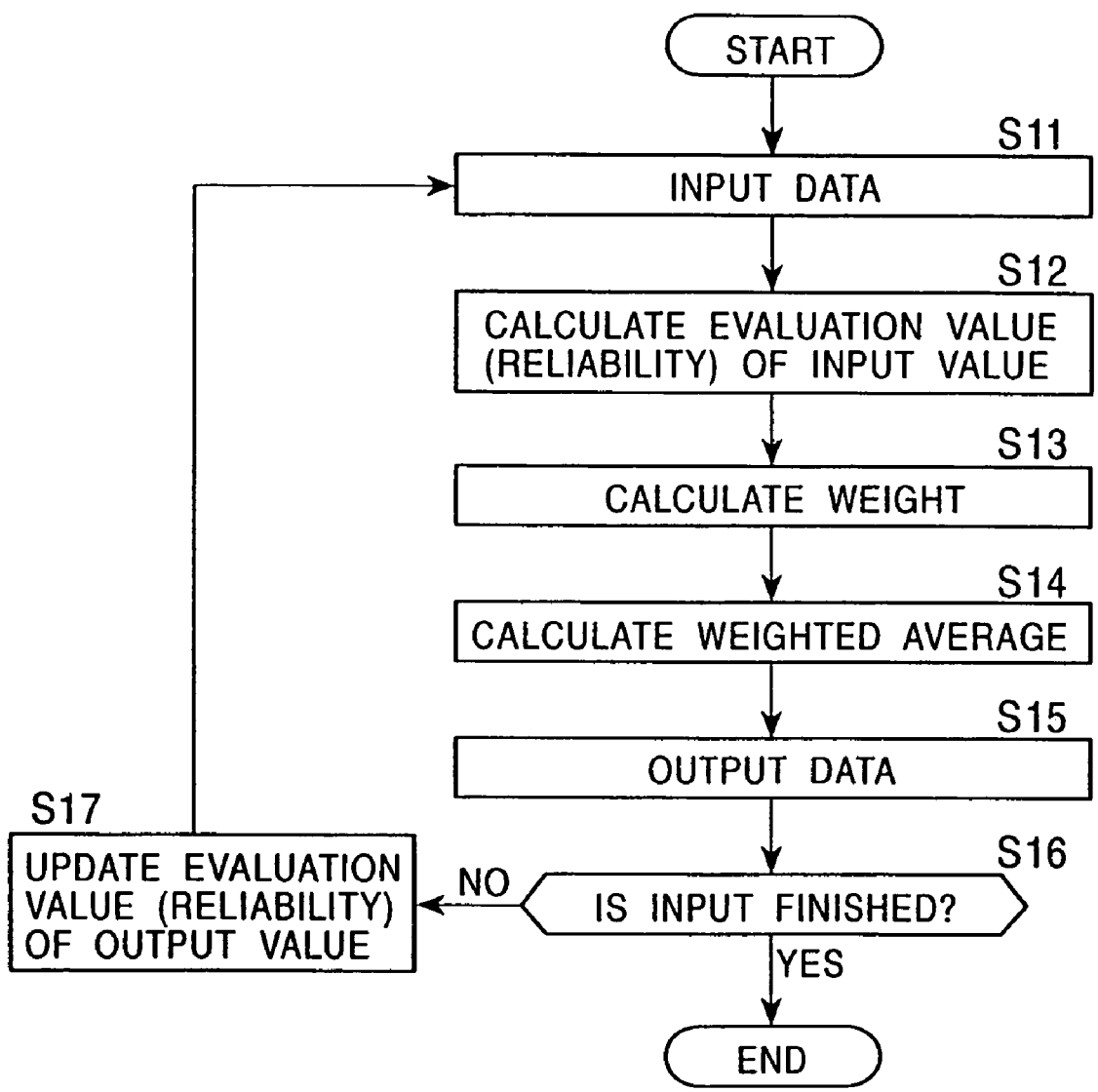
FIG. 8 is a flowchart showing the processing of the NR processing circuit shown in FIG. 3.

More specifically, as shown in a flowchart of FIG. 8, the input data x(t) is input to the noise-amount estimate section 1 (the latch circuit $11_1$ and the noise-amount calculation section 11) and to the noise removing section 2 (the weighting section 23) in a step S11.

In the next step S12, the noise-amount estimate section 1 estimates the noise amount of the input data x(t), and the input reliability calculation section 12 of the noise removing section 2 obtains the input reliability $\alpha_{x(t)}$ from the amount of noise.

More specifically, the latch circuit $11_1$ of the noise-amount estimate section 1 latches the received input data in synchronization with the timing when the input data is received, and sends it to the subsequent-stage latch circuit $11_2$ and to the noise-amount calculation section 11. The latch circuit $11_2$ and the latch circuit $11_3$ latch the input data output from the previous-stage latch circuits $11_1$ and $11_2$ and send the data to the subsequent-stage latch circuits $11_3$ and $11_4$ and to the noise-amount calculation section 11, respectively, in the same way as the latch circuit $11_1$. The latch circuit $11_4$ latches the input data output from the previous-stage latch circuit $11_3$ and sends it to the noise-amount calculation section 11. Therefore, the noise-amount calculation section 11 receives the input data x(t−1) to x(t−4) from the latch circuits $11_1$ to $11_4$, respectively, at the same time when it receives the input data x(t). The noise-amount calculation section 11 obtains the variance of the input data x(t) to x(t−4) and sends it as the noise amount of the input data x(t) to the input reliability calculation section 12, as described above.

The input reliability calculation section 12 obtains the reciprocal of the noise-amount sent from the noise-amount calculation section 11, and sends it as the input reliability $\alpha_{x(t)}$ of the input data x(t) to the output reliability calculation section 13 and to the weight calculation section 15.

At the timing when the input reliability calculation section 12 sends the input reliability $\alpha_{x(t)}$ to the weight calculation section 15, the latch circuit 14 latches the output reliability $\alpha_{y(t-1)}$ output from the output reliability calculation section 13 one sample before. In a step S13, the weight calculation section 15 uses the input reliability $\alpha_{x(t)}$ sent from the input reliability calculation section 12 and the output reliability $\alpha_{y(t-1)}$ latched by the latch circuit 14 to obtain the weight w(t) according to the expression (6). This weight w(t) is sent to the weighting section 21 and the operation section 22.

The weighting section 21, the operation section 22, the weighting section 23, the operation section 24, and the latch circuit 25 use the weight w(t) output from the weight calculation section 15 to calculate the weighted average of the input data x(t) and the output data y(t−1) obtained one sample before, according to the expression (8).

Specifically, the weighting section 21 multiplies the output of the latch circuit 25 by the weight w(t) sent from the weight calculation section 15, and sends the product to the operation section 24. The latch circuit 25 latches the output data y(t−1) which the operation section 24 outputs the last time, at the timing when the weight calculation section 15 outputs the weight w(t). Therefore, the weighting section 21 obtains the product w(t)y(t−1) of the output data y(t−1) and the weight w(t) and sends it to the operation section 24.

The operation section 22 subtracts the weight w(t) sent from the weight calculation section 15, from one, and sends the subtraction value, 1−w(t), to the weighting section 23. The weighting section 23 multiplies the output, 1−w(t), of the operation section 22 by the input data x(t) and sends the multiplication result, (1−w(t))x(t), to the operation section 24.

The operation section 24 adds the output, w(t)y(t−1), of the weighting section 21 and the output, (1−w(t))x(t), of the weighting section 23. In other words, with the use of the weight w(t) output from the weight calculation section 15, the weighted average of the input data x(t) and the output data y(t−1) obtained one sample before is calculated according to the expression (8).

This weighted average is output as the output data y(t) in a step S15. The output data y(t) is sent to the latch circuit 25 and latched.

In the next step S16, it is determined whether input data still exists. When it is determined in the step S16 that input data to be processed still exists, the procedure proceeds to a step S17 and the output reliability calculation section 13 updates the output reliability. Specifically, the output reliability calculation section 13 adds the input reliability $\alpha_{x(t)}$ calculated in the step S12 by the input reliability calculation section 12 and the output reliability $\alpha_{y(t-1)}$ obtained one sample before and latched by the latch circuit 14, according to the expression (5)

to obtain the current output reliability $\alpha_{y(t)}$, and sends it to the latch circuit 14. Then, the procedure returns to the step S11, and the same processing is repeated with the next input data.

On the other hand, when it is determined in the step S16 that input data to be processed does not exist, the processing is terminated.

As described above, the input reliability $\alpha_{x(t)}$ of the current input data x(t) and the output reliability $\alpha_{y(t-1)}$ obtained one sample before are added to calculate the weight w(t). Then, according to the weight w(t), the weighted average of the current input data x(t) and the output data y(t−1) obtained one sample before is calculated, and the average is output as the output data y(t) serving as the processing result of the input data x(t). The output reliability $\alpha_{y(t)}$ of the output data y(t) is then obtained (updated) by adding the current input reliability $\alpha_{x(t)}$ to the output reliability $\alpha_{y(t-1)}$ obtained one sample before. In the same way, input data x(t+1), x(t+2), . . . is sequentially processed. Therefore, the weight w(t) is learned such that portions having high noise levels are not much taken into account and portions having low noise levels are sufficiently taken into account in previous input data. In other words, the NR processing circuit 100 obtains a weight w(t) adaptive to input data, and as a result, improves the output data every moment as learning of the weight w(t) proceeds. The NR processing circuit 100 effectively removes noise from the input data and outputs data.

In the above-described case, since the NR processing circuit 100 uses the reciprocal of the variance of input data as the input reliability $\alpha_{x(t)}$, the input reliability $\alpha_{x(t)}$ indicates the dispersion of the input data within a predetermined time range. Therefore, when the degree of noise included in input data, for example, the S/N ratio of the input data, varies, the NR processing circuit 100 very effectively removes the noise.

When the reciprocal of the variance of the input data is used as the input reliability $\alpha_{x(t)}$ in the NR processing circuit 100, however, the effect of noise removal is slightly lowered for a local change of a noise level, namely, a change in a very narrow area, due to the nature of the variance.

The local change of a noise level can be effectively handled by using, for example, the reciprocal of the error square of the current input data against the average of input data, as the input reliability $\alpha_{x(t)}$.

In this case, the input reliability $\alpha_{x(t)}$ is calculated in the following way.

Figure 9:
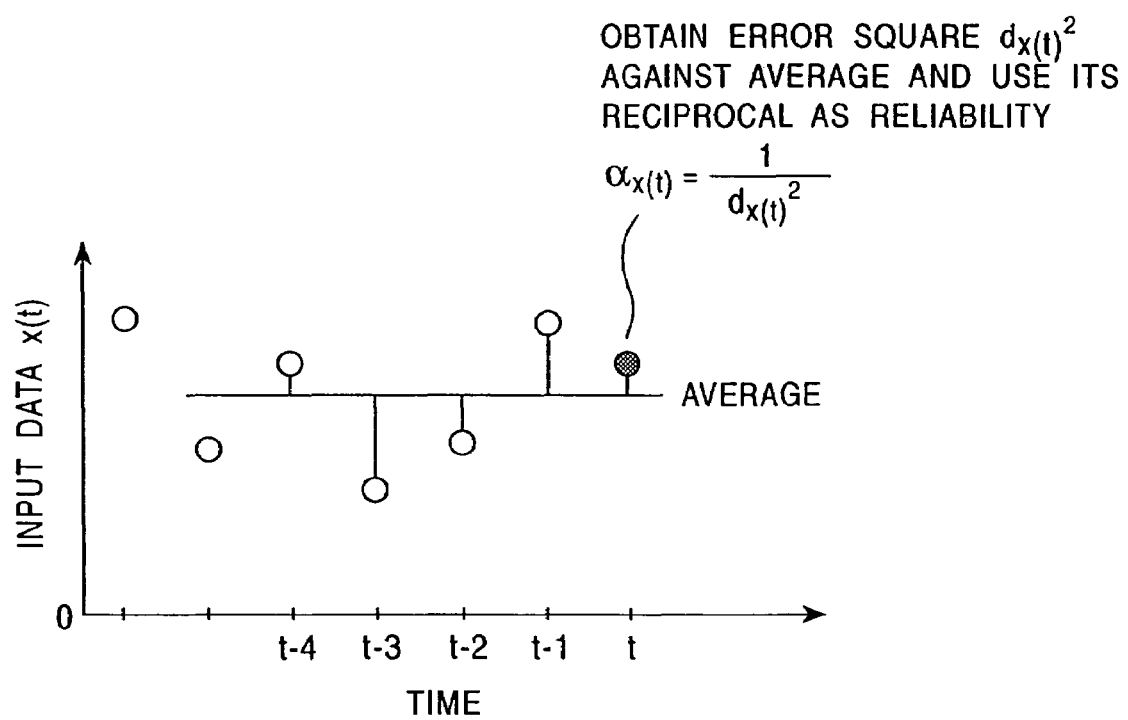
FIG. 9 is a view showing an input-reliability calculation method.

Specifically, for example, the NR processing circuit 100 calculates the average m(t) of five-sample input data x(t) to x(t−4) according to an expression (16) as shown in FIG. 9.

$$m(t) = \frac{\sum_{n=0}^{N-1} x(t-n)}{N} \quad (16)$$

In an embodiment shown in FIG. 9, N equals 5 in the expression (16).

With the use of the input data x(t) and the average m(t), the NR processing circuit 100 calculates an error square $d_{x(t)}^2$ of the input data x(t) against the average m(t) according to an expression (17).

$$d_{x(t)}^2 = (x(t) - m(t))^2 \quad (17)$$

Then, the reciprocal of the error square $d_{x(t)}^2$ is obtained according to the following expression to obtain the input reliability $\alpha_{x(t)}$.

$$\alpha_{x(t)} = \frac{1}{d_{x(t)}^2} \quad (18)$$

As described above, the method using the reciprocal of the error square as the input reliability $\alpha_{x(t)}$ is especially effective when the average m(t) is close to the true value.

In the above description, the input reliability $\alpha_{x(t)}$ is obtained based on either the variance $\sigma_{x(t)}^2$ or the error square $d_{x(t)}^2$. It can be also obtained based on both. Specifically, for example, the sum of the reciprocal of the variance $\sigma_{x(t)}^2$ and the reciprocal of the error square $d_{x(t)}^2$ can be used as an input reliability $\alpha_{x(t)}$.

Since the variance $\sigma_{x(t)}^2$ indicates the degree of the local dispersion of input data in a rather wide area and the error square $d_{x(t)}^2$ indicates the degree of the local dispersion of the data in a narrow area, when a combination of these factors is used as the input reliability $\alpha_{x(t)}$, even if the input data has a changing S/N ratio and a local level of noise included in the input data also changes, the noise is effectively removed.

When input data x(t) is one-dimensional data, such as audio data, output data y(t−1) is obtained as a result of processing of input data x(t−1), which is one sample before the input data x(t). When input data x(t) is two-dimensional data, such as image data, output data y(t−1) is obtained as a result of processing of input data x(t−1), which is one frame (or field) before the input data x(t).

Specifically, when a pixel (pixel value of the pixel) in the t-th frame is called x(t); noise is removed according to the expression (8) from the pixel x(t) serving as an input pixel; and the resultant output pixel is output, a pixel in the (t−1)-th frame, disposed at the same position in space as the input pixel x(t) in the t-th frame is called an input pixel x(t−1). An output pixel y(t−1) indicates the pixel obtained by removing noise from the input pixel x(t−1).

When an image serving as input data has no motion, in other words, when an image serving as input data is still, no problem occurs. When an image serving as input data has motion (when noise is removed from a motion image), since the true value of an input pixel x(t) differs from that of an input pixel x(t−1) obtained one frame before and disposed as the same position as the input pixel x(t), the output reliability $\alpha_{y(t-1)}$ of the output pixel y(t−1) corresponding to the input pixel x(t−1) obtained one frame before and having a different true value from the input pixel x(t) is not reliable to obtain the output pixel y(t), which is obtained by removing noise from the input pixel x(t).

In other words, when an image serving as input data has motion, the output reliability $\alpha_{y(t-1)}$ of the output pixel y(t−1), used to obtain the output pixel y(t) corresponding to the input pixel x(t), is affected by the motion amount of the input pixel x(t) and is reduced by the amount corresponding to the motion amount.

The motion amount of the input pixel x(t) is called m(t), and the output reliability $\alpha_{y(t-1)}$ is changed to (1.0−m(t)) x $\alpha_{y(t-1)}$, which serves as a compensation term. In the present embodiment, the motion amount m(t) is set to a real number between 0 and 1. The motion amount m(t) is 0 when the input pixel x(t) is completely still. The motion amount m(t) increases as the input pixel x(t) moves largely. The motion amount m(t) reaches 1 when the input pixel x(t) moves largely (it moves completely) and it is considered that the true value of the input pixel x(t) is irrelevant to that of the input pixel x(t−1) disposed at the same position as the input pixel x(t), on the frame one frame before.

In this case, the output reliability $\alpha_{y(t)}$ to be obtained by the expression (5) is obtained by the following expression.

$$\alpha_{y(t)} = (1.0 - m(t))\alpha_{y(t-1)} + \alpha_{x(t)} \quad (19)$$

According to the expression (19), when the motion amount m(t) is 0, the output reliability $\alpha_{y(t)}$ (this-time output reliability) of the output pixel y(t) is obtained by the use of the output reliability $\alpha_{y(t-1)}$ (previous-time output reliability) of the output pixel y(t−1) obtained one frame before. On the other hand, when the motion amount m(t) is 1, the output reliability $\alpha_{y(t-1)}$ obtained at the previous time is ignored (not used), in other words, the input reliability which has been summed up so far is discarded, and the output reliability $\alpha_{y(t)}$ is obtained.

In this case, the weight w(t) to be obtained by the expression (6) is obtained by the following expression.

$$w(t) = (1 - m(t))\,\alpha_{y(t-1)} / ((1 - m(t))\alpha_{y(t-1)} + \alpha_{x(t)}) \quad (20)$$

The weight 1−w(t) indicated by the expression (7) is obtained by the following expression.

$$1 - w(t) = \alpha_{x(t)} / ((1 - m(t))\,\alpha_{y(t-1)} + \alpha_{x(t)}) \quad (21)$$

Figure 10:
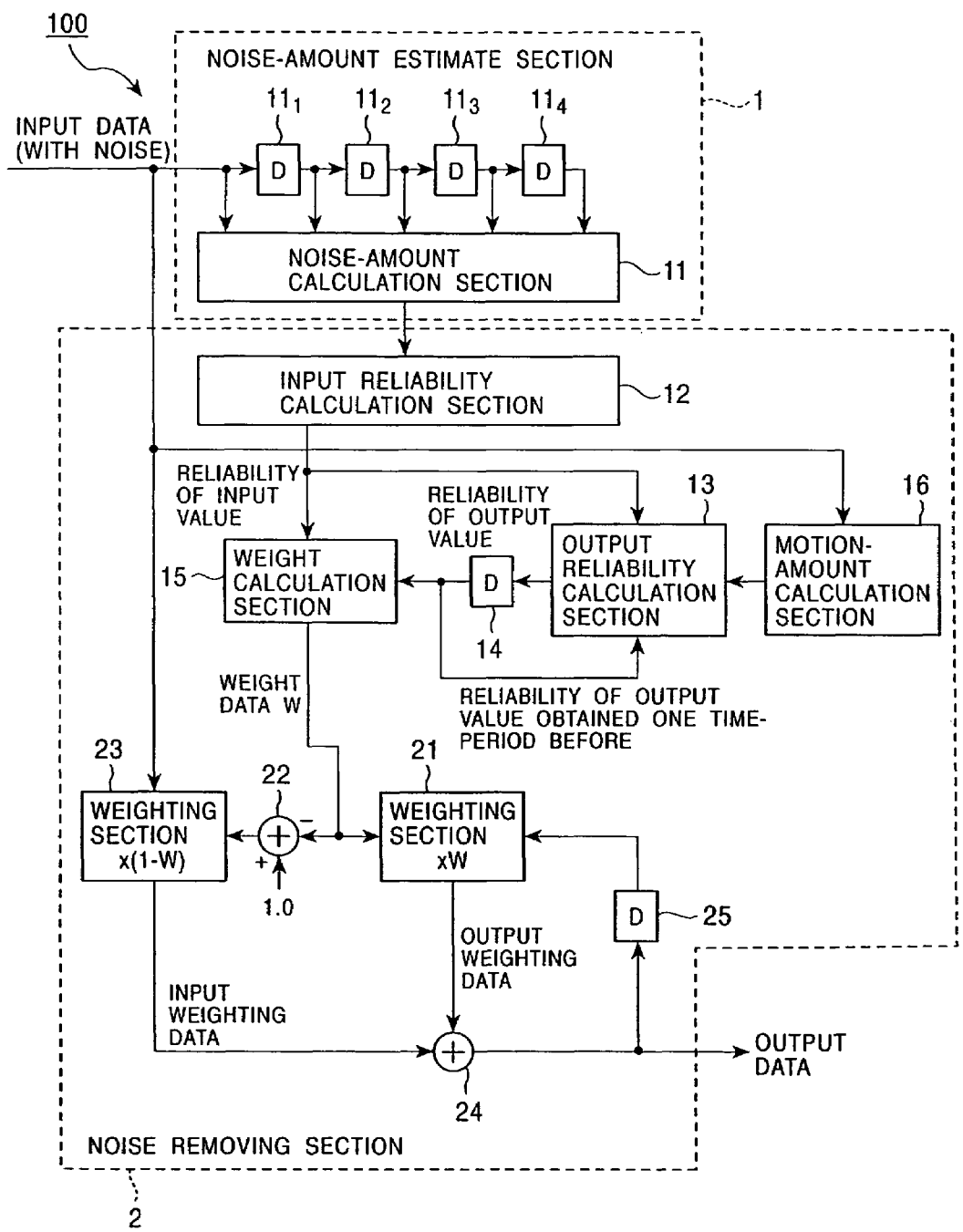
FIG. 10 is a block diagram of a first example structure of the NR processing circuit shown in FIG. 1.

FIG. 10 shows a detailed example structure of the NR processing circuit shown in FIG. 1 in a case in which noise is removed from an image with the motion amount m(t) described above being introduced. In FIG. 10, the same symbols as those used in FIG. 3 are assigned to the portions corresponding to those shown in FIG. 3, and descriptions thereof are appropriately omitted. More specifically, the NR processing circuit shown in FIG. 10 has basically the same structure as that shown in FIG. 3 except that a motion-amount calculation section 16 is newly provided.

The motion-amount calculation section 16 receives the input pixel x(t) as input data. The motion-amount calculation section 16 obtains the motion amount m(t) of the input pixel x(t) and sends it to the output reliability calculation section 13.

The motion amount m(t) of the input pixel x(t) corresponds to the value corresponding to the difference between the true value of the input pixel x(t) and that of the input pixel x(t−1) disposed at the same position as the input pixel x(t), on the frame one frame before, that is, the change of the true value generated by the movement (the movement of an image portion displayed at the input pixel x(t)) of the input pixel x(t). The motion amount m(t) is basically obtained from the difference (x(t)−x(t−1)) of the input pixels x(t) and x(t−1).

The difference between the input pixels x(t) and x(t−1) includes not only the difference between the true values thereof but also a change of noise (the difference between the noise included in the input pixel x(t) and that included in the input pixel x(t−1)). It is preferred that the difference between the input pixels x(t) and x(t−1) be obtained with the change of noise being removed as much as possible.

Figure 11A:
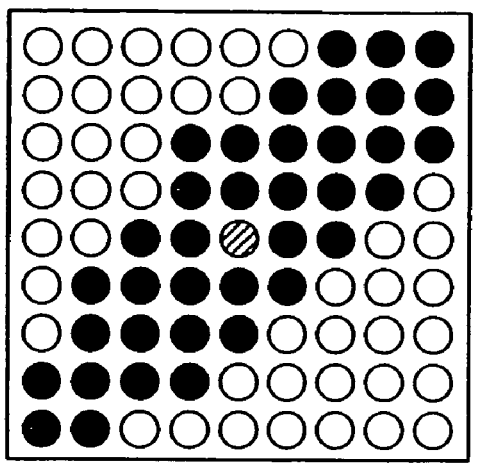
FIG. 11A is a view showing a pixel area used for calculating the amount of motion in a motion-amount calculation section 16 shown in FIG. 10.
Figure 11B:
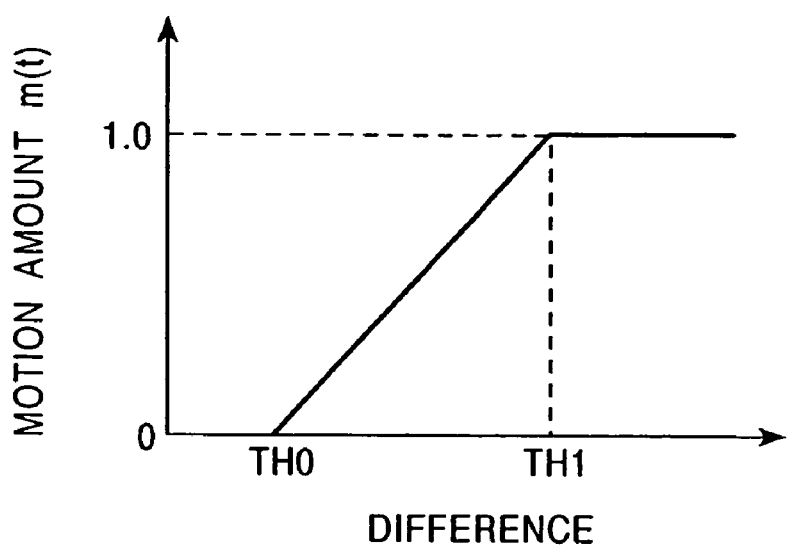
FIG. 11B is a view showing a conversion function for converting a difference calculated in the pixel area shown in FIG. 11A to the amount of motion.

The motion-amount calculation section 16 obtains the motion amount m(t) as shown in FIG. 11A and FIG. 11B.

The motion-amount calculation section 16 sets the input pixel x(t) for which an motion amount m(t) is to be obtained to an aimed-at pixel and forms a block having a predetermined size with the aimed-at pixel (indicated by a hatched circle in FIG. 11A) placed at the center of the block. In FIG. 11A, a nine-by-nine input-pixel block is generated. The size of the block is not limited to this size. A seven-by-seven pixel block may be used. In the nine-by-nine input-pixel block, pixels (indicated by black circles in FIG. 11) having differences in level from the aimed-at pixel not more than a predetermined threshold are detected. The differences between the detected input pixels indicated by the black circles and the aimed-at pixel, and those disposed at the same positions on the frame one frame before are calculated. The average of the differences is obtained as the difference x(t)−x(t−1) of the input pixels x(t) and x(t−1) in a condition in which the change of noise in the spatial direction is removed as much as possible.

As the threshold used to detect input pixels in a block as described above, for example, a value about twice the standard deviation of the noise amount obtained by the noise-amount calculation section 11 can be used.

The motion-amount calculation section 16 converts the difference x(t)−x(t−1) by a conversion function, such as that shown in FIG. 11B, to obtain a motion amount m(t) which ranges from 0 to 1.

In the embodiment shown in FIG. 11B, the motion amount m(t) is 0 when the difference x(t)−x(t−1) is equal to or less than a predetermined threshold TH0. The motion amount m(t) increases in proportion to the difference x(t)−x(t−1) when the difference x(t)−x(t−1) exceeds the predetermined threshold TH0. When the difference x(t)−x(t−1) is equal to or more than a predetermined threshold TH1 (>TH0), the motion amount m(t) is set to 1.

As the threshold TH0, for example, 0 can be used. As the threshold TH1, for example, a value about three times the standard deviation of the noise amount obtained by the noise-amount calculation section 11 can be used.

In the above case, the motion-amount calculation section 16 calculates the differences between the input pixels in the frame where the aimed-at pixel is disposed and the corresponding input pixels in the frame one frame before to obtain the motion amount m(t). The motion amount m(t), can be obtained in other ways, such as a way in which the differences between input values in the frame where the aimed-at pixel is disposed and the corresponding output pixels in the frame one frame before are calculated.

In FIG. 11B, the motion-amount calculation section 16 converts the difference x(t)−x(t−1) to the motion amount m(t) by a linear function when the difference falls in the range from the threshold TH0 to the threshold TH1 both inclusive. The difference x(t)−x(t−1) may be converted to a motion amount m(t) by a non-linear function.

Figure 12:
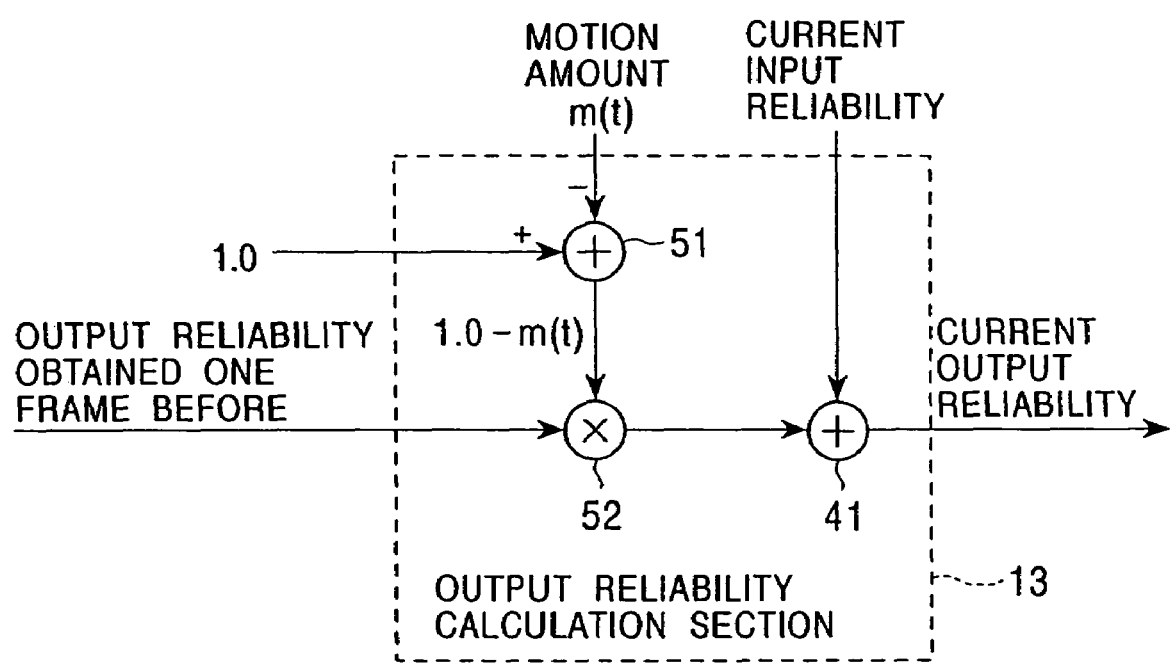
FIG. 12 is a block diagram showing an example structure of an output reliability calculation section 13 shown in FIG. 10.

FIG. 12 shows an example structure of the output reliability calculation section 13 shown in FIG. 10. In FIG. 12, the same symbols as those used in FIG. 6 are assigned to the portions corresponding to those shown in FIG. 6. In FIG. 12, the output reliability calculation section 13 is formed with operation sections 51 and 52 being newly added.

The operation section 51 receives the motion amount m(t) obtained by the motion-amount calculation section 16. The operation section 51 subtracts the motion amount m(t) from 1 and sends the difference 1−m(t) to the operation section 52. The operation section 52 receives the output reliability $\alpha_{y(t-1)}$ obtained at the previous time, from the latch circuit 14 in addition to the difference 1−m(t) sent from the operation section 51. The operation section 52 uses 1−m(t) as a compensation term, multiplies the output reliability $\alpha_{y(t-1)}$ obtained at the previous time by the compensation term, and outputs the product $(1-m(t))\,\alpha_{y(t-1)}$ to an operation section 41 as a compensation result obtained by compensating the output reliability $\alpha_{y(t-1)}$ obtained at the previous time correspondingly to the motion amount m(t).

The operation section 41 adds the input reliability $\alpha_{x(t)}$ obtained this time sent from the input reliability calculation section 12 to the output $(1-m(t))\alpha_{y(t-1)}$ of the operation section 52, and outputs the sum as the output reliability $\alpha_{y(t)}$ obtained this time. In other words, the output reliability calculation section 13 obtains the compensated output reliability $\alpha_{y(t)}$, indicated by the expression (19).

As described above, in the NR processing circuit shown in FIG. 10, the output reliability $\alpha_{y(t-1)}$ is compensated according to the motion amount m(t) of the input pixel x(t) and then the weight w(t) is obtained according to the compensated output reliability. Since the output pixel y(t) corresponding to the input pixel x(t) is obtained according to the weight w(t), noise is effectively removed from the input pixel x(t) to generate the output pixel y(t).

In the embodiment shown in FIG. 10, since x(t−1) is the input pixel obtained one frame before x(t) as described above, the latch circuits 11₄, 14, and 25 latch (delay) data input thereto for the one-frame period and output.

As described above, since the latch circuits 11₁ to 11₄ in the NR processing circuit shown in FIG. 10, which remove noise from an image, delay the input pixel x(t) for the one-frame period, the noise-amount calculation section 11 obtains the variance of the input pixels x(t) to x(t−4) disposed at the same position as the input pixel x(t) in the previous five frames, including the frame for the input pixel x(t) to be processed, as the noise amount. When the input pixels x(t) to x(t−4) have motion, because the variance is affected by the motion in the image, the noise amount of the input pixel x(t), which is the variance of the input pixels x(t) to x(t−4), is inaccurate due to the effect of the motion. The input reliability $\alpha_{x(t)}$ obtained by the input reliability calculation section 12 by the use of the noise amount becomes also inaccurate, and this is not preferable.

It is possible, for example, that the motion vector of the input pixel x(t) is obtained to achieve motion compensation, and the noise amount of the input pixel x(t) is obtained by using the image obtained after the motion compensation.

In this case, however, a motion-vector detecting apparatus for detecting a motion vector and a motion compensation apparatus for achieving motion compensation are separately required.

The noise amount of the input pixel x(t) can, for example, be obtained (estimated) in the following way.

Figure 13:
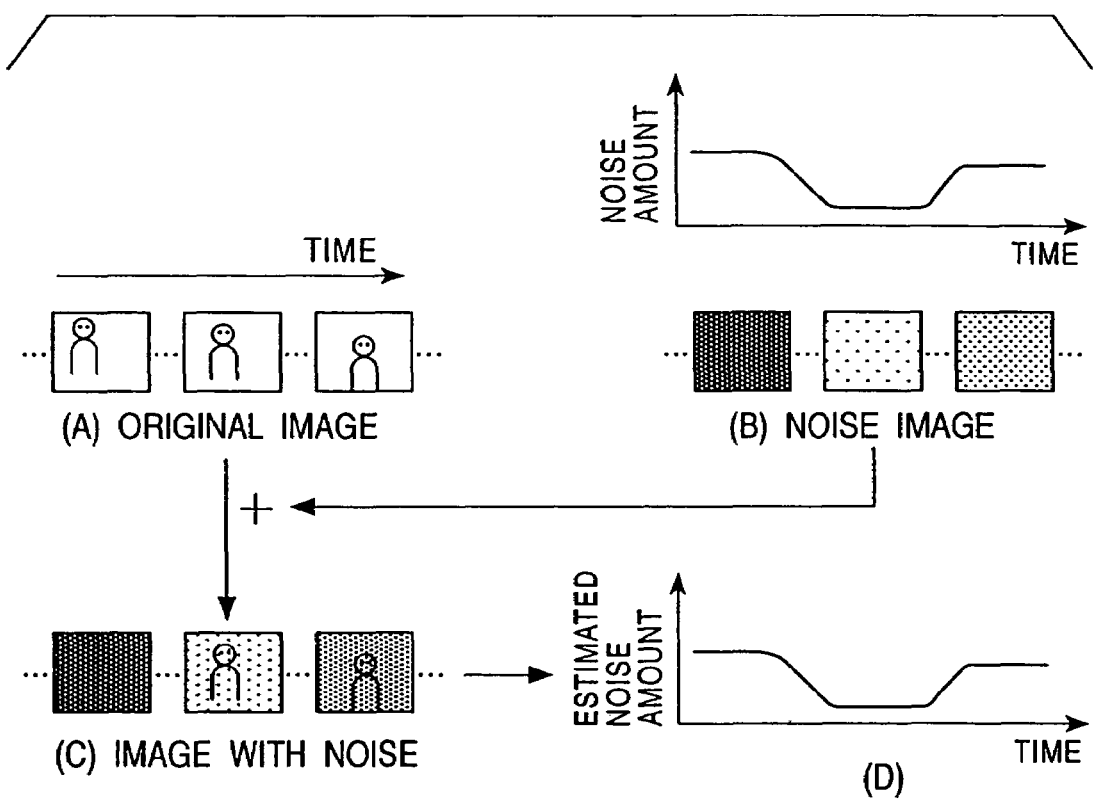
FIG. 13 is a view showing noise-amount estimate processing.

When it is assumed that noise included in an image changes in terms of time but does not change spatially, the image is the sum (shown in FIG. 13(C)) of an image (image formed of true values, hereinafter called the original image) having no noise (shown in FIG. 13(A)) and an image (hereinafter called a noise image) shown in FIG. 13(B) which has noise changing in frames but being constant spatially.

For an image having noise such as that shown in FIG. 13(C), when the distribution of the errors of pixel values against the original image, that is, the variance (or standard deviation) of the pixel values, is defined as the noise amount of the image having noise, the noise amount can be relatively precisely estimated in the following way.

Figure 15A:
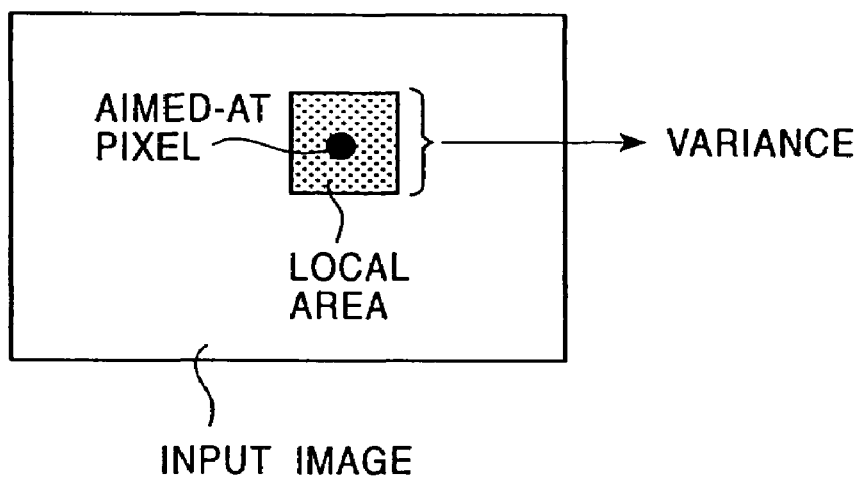
FIG. 15A is a view showing the calculation of a variance in a local area of an image, the variance being used for estimating the amount of noise.
Figure 15B:
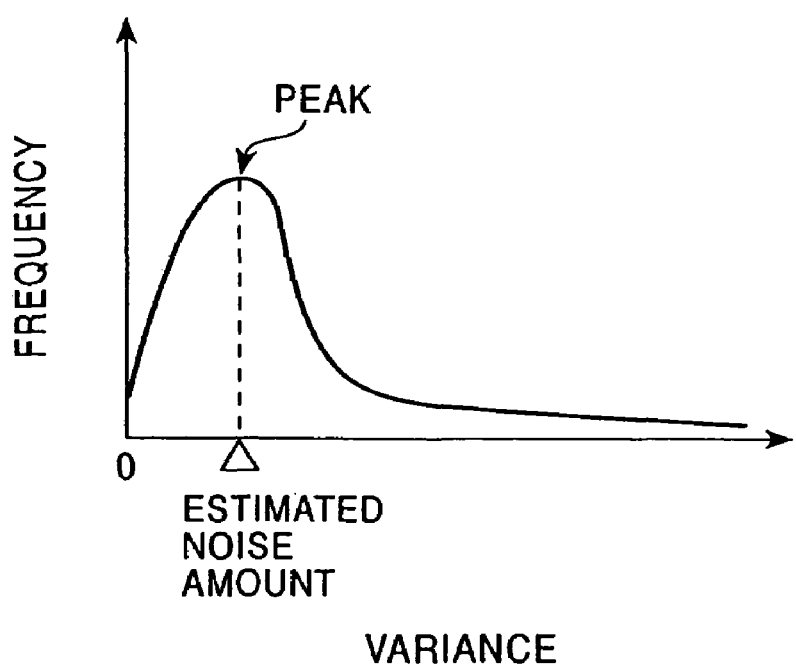
FIG. 15B is a view showing a noise-amount estimate method in which the variance having the most frequent value in a variance histogram is regarded as the amount of noise.

As shown in FIG. 15A, the noise-amount estimate section 1 sequentially sets each pixel constituting one frame of an image having noise to an aimed-at pixel, and calculates the variance of pixels included in a local area (in the spatial direction) which has the aimed-at pixel at the center. As indicated in FIG. 15B, the noise-amount estimate section 1 obtains the histogram of the variances in the frame, and regards the variance corresponding to the maximum frequency as a noise mount included in each pixel constituting the frame. The noise mount is estimated, for example, as shown in FIG. 13(D).

Figure 16:
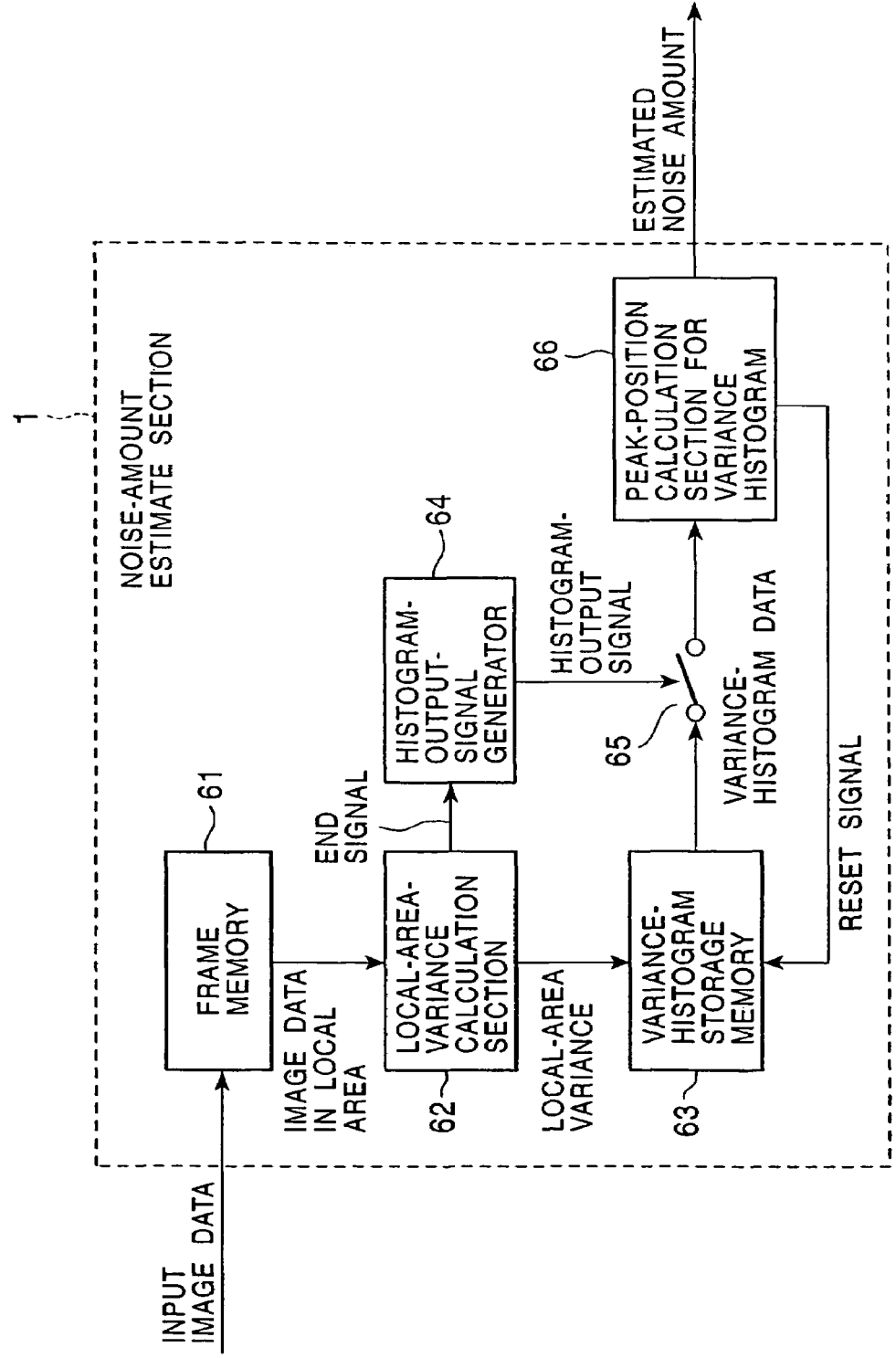
FIG. 16 is a block diagram showing another example structure of a noise-amount estimate section 1 shown in FIG. 10.

The noise-amount estimate section 1 in the NR processing circuit shown in FIG. 10 obtains the noise amount of the input pixel as described above. FIG. 16 shows an example structure of the noise-amount estimate section 1.

A frame memory 61 receives an image (input image) having noise. The frame memory 61 stores the input image having noise in units of frames.

A local-area-variance calculation section 62 sequentially sets each (input) pixel constituting the input image stored in the frame memory 61 to an aimed-at pixel, calculates the variance of the input pixels included in a local area which has the aimed-at pixel at the center, and sends it to a variance-histogram storage memory 63. When the foregoing variance calculation is finished with all input pixels constituting the input image stored in the frame memory 61 being set to aimed-at pixels, the local-area-variance calculation section 62 further sends a termination signal indicating that the variance calculation has been terminated, to a histogram-output-signal generator 64.

The variance-histogram storage memory 63 generates the histogram of the variances of the input pixels constituting the input image stored in the frame memory 61, the variances being sent from the local-area-variance calculation section 62. More specifically, when the variance-histogram storage memory 63 receives the variance of input pixels from the local-area-variance calculation section 62, it increments by 1 the value stored at the address corresponding to the variance. Values stored in the variance-histogram storage memory 63 are reset to 0 by a reset signal sent from a peak-position calculation section 66, described later.

When the histogram-output-signal generator 64 receives the termination signal from the local-area-variance calculation section 62, it outputs to a switch 65 a histogram-output signal indicating that the histogram should be output. When the switch 65 receives the histogram-output signal from the histogram-output-signal generator 64, it temporarily changes its state from off to on, and sends the variance histogram stored in the variance-histogram storage memory 63 to the peak-position calculation section 66.

The peak-position calculation section 66 receives the variance histogram sent from the variance-histogram storage memory 63 through the switch 65, obtains the peak value of the histogram, and outputs the variance corresponding to the peak value as the estimate of the noise amount included in each input pixel constituting the input image. The peak-position calculation section 66 sends the reset signal to the variance-histogram storage memory 63 at the timing when it receives the variance histogram stored in the variance-histogram storage memory 63.

Noise-amount estimate processing for estimating the noise amount of an input pixel by the noise-amount estimate section 1 shown in FIG. 16 will be described below by referring to a flowchart shown in FIG. 17.

Figure 17:
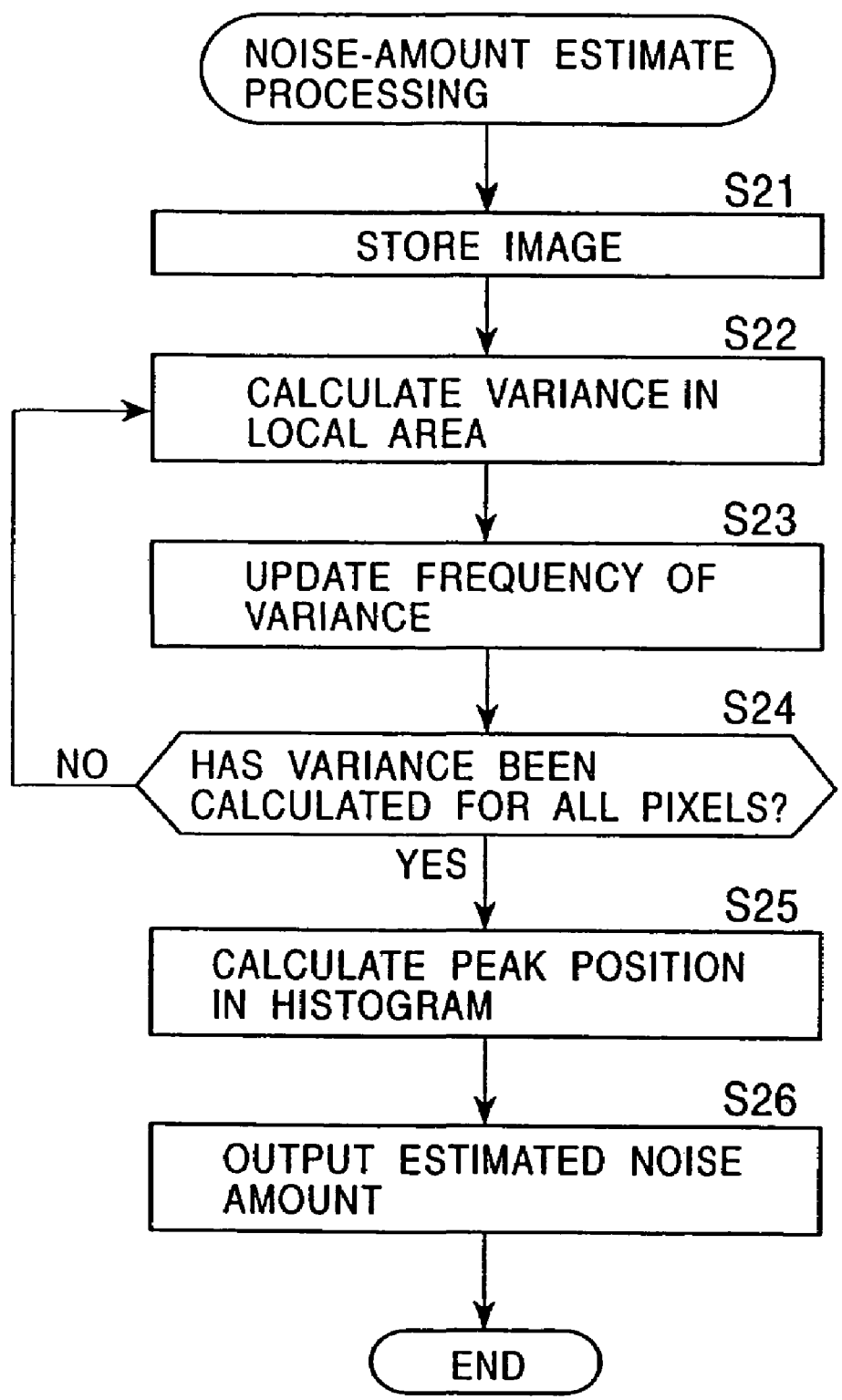
FIG. 17 is a flowchart of noise-amount estimate processing executed by the noise-amount estimate section 1 shown in FIG. 16.

When an input image of one frame is input to the noise-amount estimate section 1, the noise-amount estimate processing shown in FIG. 17 is executed.

In the noise-amount estimate processing, the one-frame input image is first stored in the frame memory 61 in a step S21, and the processing proceeds to a step S22. In the step S22, the local-area-variance calculation section 62 sets a predetermined input pixel constituting the input image stored in the frame memory 61 to an aimed-at pixel, and calculates the variance of input pixels included in a local area which has the aimed-at pixel at the center.

The variance is sent from the local-area-variance calculation section 62 to the variance-histogram storage memory 63. The variance-histogram storage memory 63 increments by 1 the value stored at the address corresponding to the variance sent from the local-area-variance calculation section 62 in a step S23 to update the frequency of the variance.

Then, in a step S24, the local-area-variance calculation section 62 determines whether the variance calculation has been finished for all input pixels constituting the input image stored in the frame memory 61, which are set to aimed-at pixels. When the local-area-variance calculation section 62 determines in the step S24 that the variance calculation has not yet been finished for all the input pixels stored in the frame memory 61, it sets an input pixel which has not yet been set to an aimed-at pixel to an aimed-at pixel, the processing returns to the step S22, and the same processes are repeated. With the processes from the steps S22 to S24 being repeated as described above, the variance-histogram storage memory 63 generates a variance histogram for the input pixels constituting the input image stored in the frame memory 61.

On the other hand, when the local-area-variance calculation section 62 determines in the step S24 that the variance calculation has been finished for all the input pixels stored in the frame memory 61, in other words, when the variance-histogram storage memory 63 has generated a variance histogram for all the input pixels constituting the input image stored in the frame memory 61, the local-area-variance calculation section 62 sends the termination signal to the histogram-output-signal generator 64. When the histogram-output-signal generator 64 receives the termination signal, it outputs the histogram-output signal to the switch 65. The switch 65 is temporarily changed from the off state to the on state, and the variance histogram stored in the variance-histogram storage memory 63 is sent to the peak-position calculation section 66.

When the peak-position calculation section 66 receives the variance histogram from the variance-histogram storage memory 63 through the switch 65, it obtains the peak value of the histogram in a step S25, and the processing proceeds to a step S26. In the step S26, the peak-position calculation section 66 outputs the variance corresponding to the peak value in the histogram as the estimated noise amount included in each input pixel constituting the input image, and sends the reset signal to the variance-histogram storage memory 63. The values stored in the variance-histogram storage memory 63 are reset to 0, and the noise-amount estimate processing is terminated.

As described above, since the noise-amount estimate section 1 calculates the variance in the local area including each input pixel constituting one frame, obtains the peak value of the variance histogram, and uses the variance corresponding to the peak value as the noise amount included in the input pixel, the noise amount of each pixel in the one frame is relatively precisely estimated by the use of just the one frame without newly providing a motion-vector detecting apparatus and a motion compensation apparatus.

When a variance is obtained by the use of all pixels constituting one frame, the variance is affected not only by the variance of noise included in the one-frame image but also by the variance of the image (original image). Therefore, it is difficult to precisely estimate the noise included in the pixels with the use of the variance obtained from all pixels constituting the one frame.

On the other hand, as described above, when a local area including each input pixel is used for the input pixel constituting one frame, the local area may have the variance of noise and that of the original image in a mixed manner, or may mainly have the variance of noise. The local area which mainly has the variance of noise corresponds to a flat part or a nearly flat part in the original image.

When the variance histogram of local areas including input pixels constituting one frame is generated for a usual image except an image having a number of edges, it is likely in general that the peak corresponds to the variance of a local area mainly having a noise variance. The noise-amount estimate processing executed by the noise-amount estimate section 1 shown in FIG. 16 uses this nature to estimate the noise amount relatively precisely.

Figure 18:
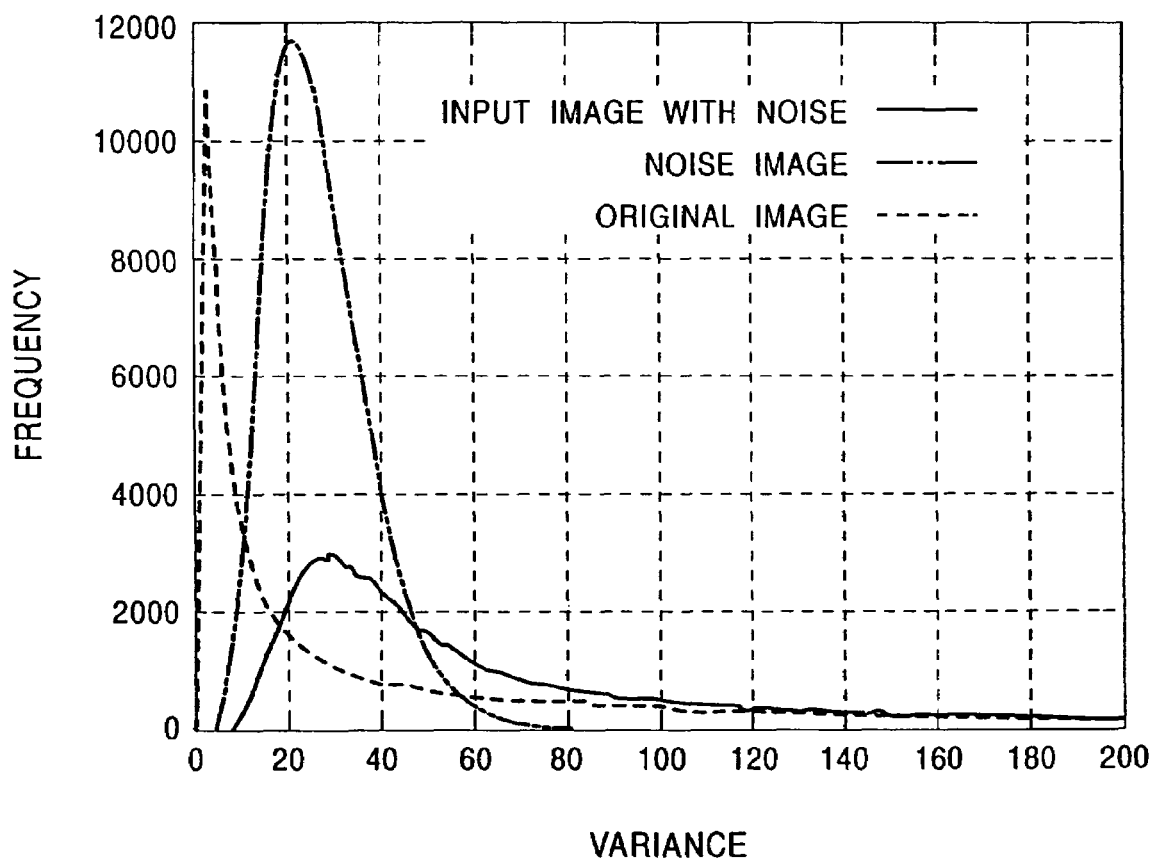
FIG. 18 is a chart showing the histograms of the amounts of noise in the original image, a noise image, and an input image.

FIG. 18 shows the variance histograms of local areas such as those described above, for the original image which is a usual image, a noise image, and an input image (image having noise) obtained by superposing the noise image on the original image.

In FIG. 18, a solid line, a two-dot chain line, and a thin dotted line indicate the variance histograms for the input image, the noise image, and the original image, respectively. It is understood that the position of the peak of the histogram for the input image almost matches that of the peak of the histogram for the noise image. A five-by-five square block is used as a local area when the histograms shown in FIG. 18 is obtained.

Figure 19:
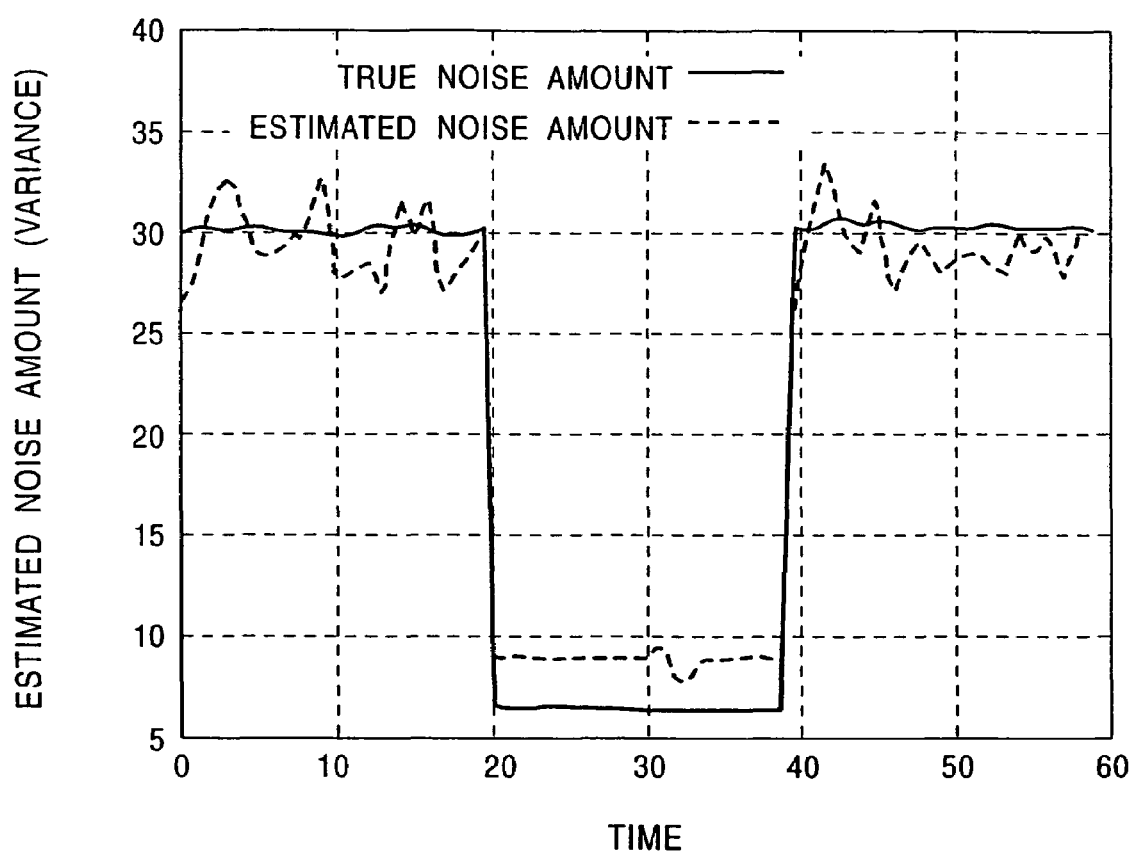
FIG. 19 is a chart showing the result of simulation for estimating the amount of noise in an embodiment of the present invention.

FIG. 19 shows a simulation result of an estimated noise amount included in an input image, obtained by the noise-amount estimate processing shown in FIG. 17.

In FIG. 19, a solid line indicates the variance of a noise image, and a dotted line indicates a variance serving as a noise amount obtained by the noise-amount estimate processing for an input image in which the noise image is superposed on the original image.

The noise image used in the simulation has smaller variances between the 20th frame to the 40th frame than in the other frames. It is understood from FIG. 19 that the noise amount is relatively precisely estimated for the input image in which the noise image is superposed.

The present invention can be implemented by special hardware or by making a computer execute a program for achieving the above processing.

In the present embodiment, the description has been made for the present invention in terms of removing noise. As described above, since input data is processed such that output data is improved as time elapses, the present invention can also be applied, for example, to a case in which the waveform of input data is shaped (equalized).

In the noise-amount estimate processing shown in FIG. 17, a noise amount common to each pixel constituting a one-frame image is estimated. The noise amount may be estimated for each area formed by diving the one-frame image. The noise amount may also be estimated for a plurality of frames in common.

As described above, according to the image processing apparatus and the image processing method according to the embodiment of the present invention, the input reliability indicating the reliability of an input pixel and the output reliability indicating the reliability of an output pixel are calculated, the motion amount of the input pixel is detected, and the output reliability is compensated according to the motion amount of the input pixel. The input pixel is processed according to the input reliability and the compensated output reliability, and the output pixel is output. Therefore, noise is effectively removed from the input pixel to generate the output pixel.

In addition, according to the image processing apparatus and the image processing method according to the embodiment of the present invention, the variance of a local area including each pixel constituting one screen is calculated, and a variance histogram is generated. The amount of noise included in the pixel is obtained according to the histogram. Therefore, the amount of noise included in the pixel is relatively precisely estimated.

The series of processing shown in FIGS. 8 and 17 can be implemented by hardware or software. When the series of processing is achieved by software, a program constituting the software is installed into a computer which is built in the NR processing circuit 100 serving as special hardware or into a general-purpose computer.

Recording media which store the program for executing the series of processing described above will be described below by referring to FIGS. 20A, 20B, and 20C. The program is installed into a computer and is made executable by the computer.

Figure 20A:
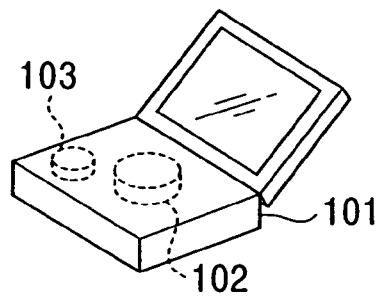
FIG. 20A is a view showing a computer into which a program for executing processing related to the present invention is installed.

The program is recorded in advance into a hard disk 102 or a semiconductor memory 103 serving as a recording medium which is built in a computer 101, as shown in FIG. 20A.

Figure 20B:
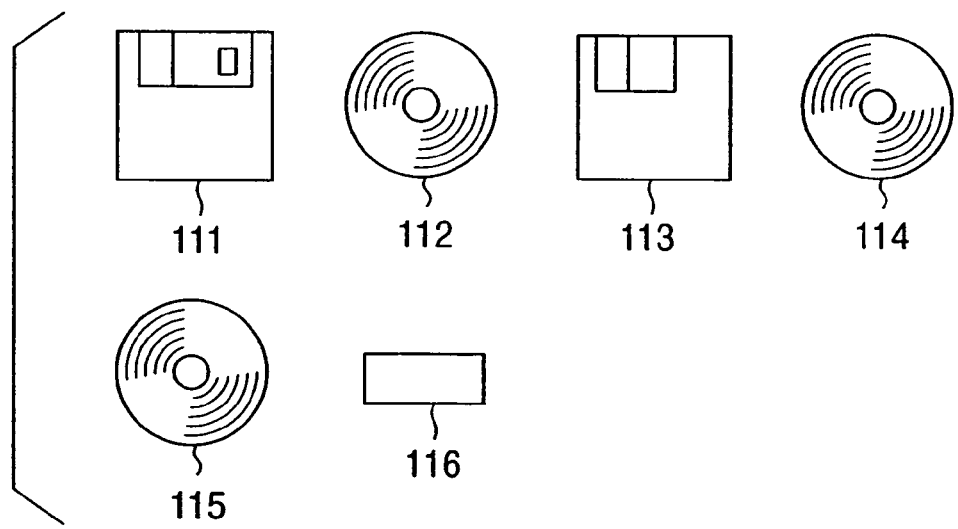
FIG. 20B is a view showing example storage media for storing the program which executes the processing related to the present invention.

Alternatively, the program is recorded temporarily or perpetually into recording media, such as a floppy disk 111, a compact disc read-only memory (CD-ROM) 112, a magneto-optical (MO) disk 113, a digital versatile disk (DVD) 114, a magnetic disk 115, and a semiconductor memory 116, as shown in FIG. 20B.

The program is installed in the computer from the above-described recording medium. Alternatively, the program is transferred by radio from a downloading site 121 to the computer 101 through an artificial satellite for digital satellite broadcasting, or to the computer 101 by wire through a network 131 such as a local area network (LAN) or the Internet; and is installed into the hard disk 102, built in the computer 101, as shown in FIG. 20C.

In the present specification, the steps describing the programs for executing various types of processing are not necessarily processed in a time sequential manner in the order in which the steps are described in the flowcharts. Processing to be executed in parallel or individually, such as parallel processing or processing by objects, is also included.

Figure 20C:
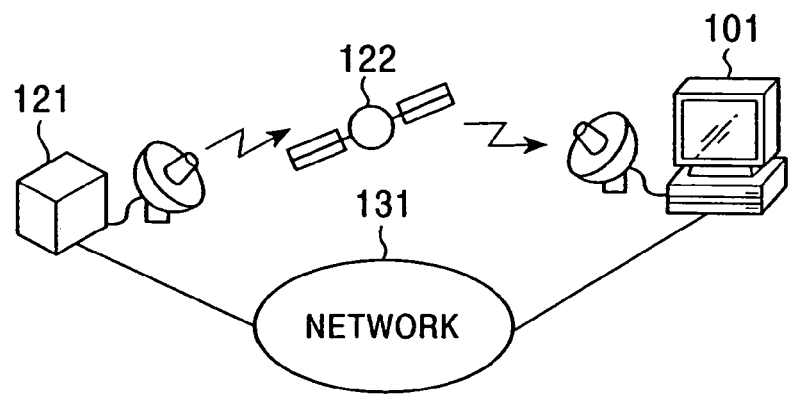
FIG. 20C is a view showing cases in which the program for executing the processing related to the present invention is distributed to the computer through a satellite and a network.
Figure 21:
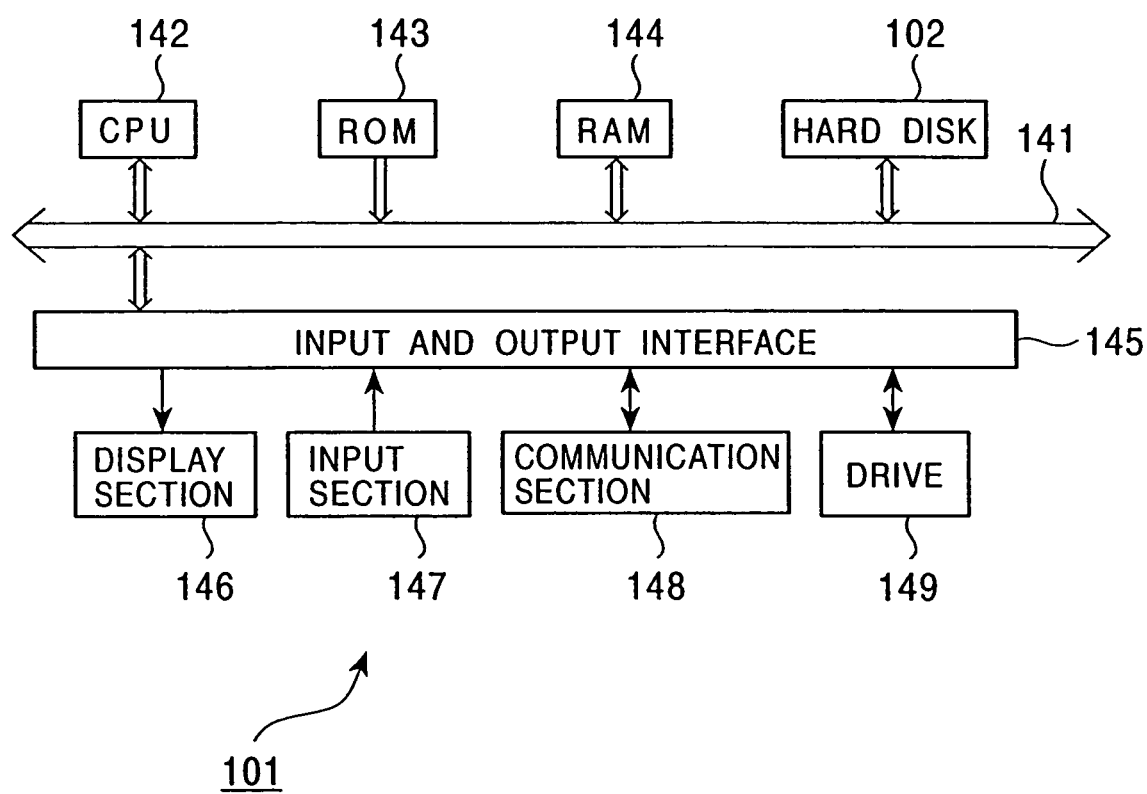
FIG. 21 is a block diagram of a computer into which the program for executing the processing related to the present invention is installed.

FIG. 21 shows an example structure of the computer 101 shown in FIGS. 20A, 20B, and 20C.

The computer 101 includes a central processing unit (CPU) 142, as shown in FIG. 21. The CPU 142 is connected to an input and output interface 145 through a bus 141. When the user operates an input section 147 formed of a keyboard and a mouse to input a command through the input and output interface 145, the CPU 142 executes a program stored in a read-only memory (ROM) 143 corresponding to the semiconductor memory 103 shown in FIG. 20A. Alternatively, the CPU 142 loads into a random access memory (RAM) 144 a program stored in the hard disk 102; a program transferred through the satellite 122 or the network 131, received by a communication section 148, and installed into the hard disk 102; or a program read from the floppy disk 111, the CD-ROM 112, the MO disk 113, the DVD 114, or the magnetic disk 115 which is loaded into a drive 149, and installed into the hard disk 102; and executes it. The CPU 142 outputs the processing result, for example, through the input and output interface 145 to a display section 146 formed of a liquid-crystal display (LCD), as required.

What is claimed is:

1. A noise-amount estimate apparatus for estimating an amount of noise in data, comprising:
   input means for receiving input data of a present time interval;
   first latching means for latching the input data of the present time interval;
   second latching means for latching an immediate previous input data from an immediate previous time interval,
   wherein the immediate previous input data is received from the first latching means;
   noise-amount calculation means for calculating the amount of noise in the present time interval as a function of a calculated variance of the input data stored in the first latching means and the second latching means,
   outputting means for outputting the calculated amount of noise as the amount of noise in the data.

2. A noise-amount estimate apparatus according to claim 1, wherein said noise-amount calculation means obtains the peak value of the histogram to calculate the value corresponding to the variance having the peak value as the amount of noise.

3. A noise-amount estimate apparatus for estimating an amount of noise in data, comprising:
   an input unit configured to receive input data of a present time interval;
   a first latching unit configured to latch the input data of the present time interval;
   a second latching unit configured to latch an immediate previous input data from an immediate previous time interval,
   wherein the immediate previous input data is received from the first latching unit;
   a noise-amount calculation unit configured to calculate the amount of noise in the present time interval as a function of a calculated variance of the input data stored in the first latching unit and the second latching unit, an outputting unit configured to output the calculated amount of noise as the amount of noise in the data.

4. A noise-amount estimate apparatus according to claim 3, wherein said noise-amount calculation unit obtains the peak value of the histogram to calculate the value corresponding to the variance having the peak value as the amount of noise.

* * * * *